(12) United States Patent
Kurita et al.

(10) Patent No.: US 10,389,894 B2
(45) Date of Patent: Aug. 20, 2019

(54) IMAGE PROCESSING APPARATUS AND METHOD, IMAGE PROJECTION APPARATUS, PRINTING APPARATUS, AND IMAGE PRINTING AND PROJECTION SYSTEM

(71) Applicant: CANON KABUSHIKI KAISHA, Tokyo (JP)

(72) Inventors: Masanao Kurita, Kawasaki (JP); Shinya Oda, Kawasaki (JP); Masayoshi Sekine, Tokyo (JP); Tetsuji Saito, Kawasaki (JP); Yasuo Suda, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/012,972

(22) Filed: Jun. 20, 2018

(65) Prior Publication Data

US 2018/0376011 A1 Dec. 27, 2018

(30) Foreign Application Priority Data

Jun. 22, 2017 (JP) .................................. 2017-122472

(51) Int. Cl.
*H04N 1/00* (2006.01)
*H04N 1/60* (2006.01)
*H04N 9/31* (2006.01)
*H04N 1/407* (2006.01)

(52) U.S. Cl.
CPC ....... *H04N 1/00267* (2013.01); *H04N 1/4076* (2013.01); *H04N 1/6027* (2013.01); *H04N 1/6097* (2013.01); *H04N 9/3185* (2013.01); *H04N 9/3188* (2013.01); *H04N 9/3194* (2013.01)

(58) Field of Classification Search
USPC ......................................................... 358/1.15
See application file for complete search history.

(56) References Cited

U.S. PATENT DOCUMENTS

| 4,657,393 A | * | 4/1987 | Stern | G01B 11/24 |
| | | | | 356/609 |
| 9,524,061 B2 | * | 12/2016 | McCaughan | G06F 3/0425 |
| 2005/0100831 A1 | * | 5/2005 | Finders | G03F 7/70333 |
| | | | | 430/322 |

FOREIGN PATENT DOCUMENTS

| JP | 5153566 B | 12/2012 |
| JP | 2016-174315 A | 9/2016 |

* cited by examiner

*Primary Examiner* — Neil R McLean
*Assistant Examiner* — Darryl V Dottin
(74) *Attorney, Agent, or Firm* — Cowan, Liebowitz & Latman, P.C.

(57) ABSTRACT

An image processing apparatus comprises: a first generation unit that generates approximate light pattern by adjusting spatial frequency of an input image, and generates a projection image data based on the approximate light pattern; and a second generation unit that generates a print image data based on the input image, wherein the second generation unit generates the print image data so that a difference between the input image and an image for observation obtained by superimposing projection light projected based on the projection image data onto a printed matter printed based on the print image data is reduced.

25 Claims, 24 Drawing Sheets

150

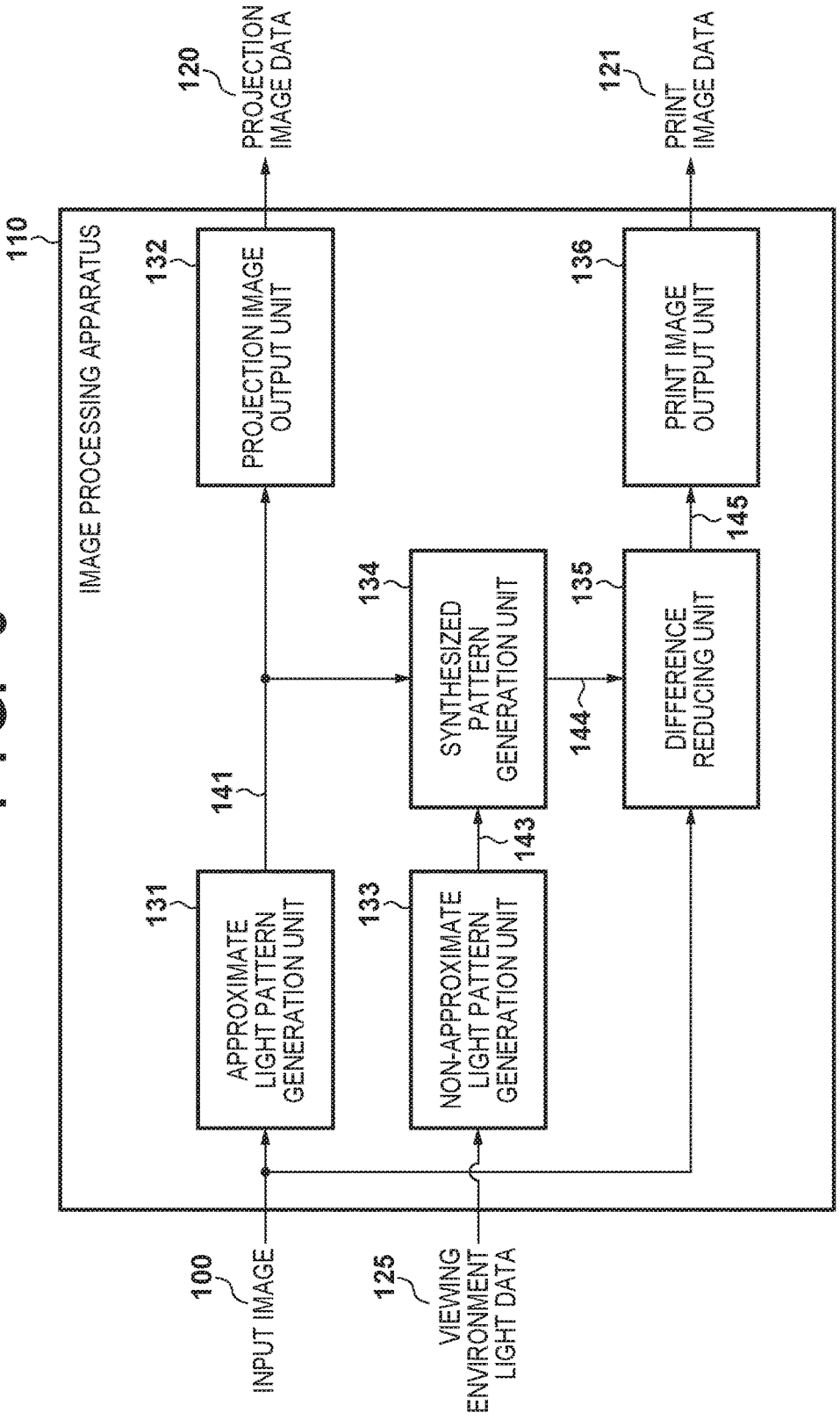

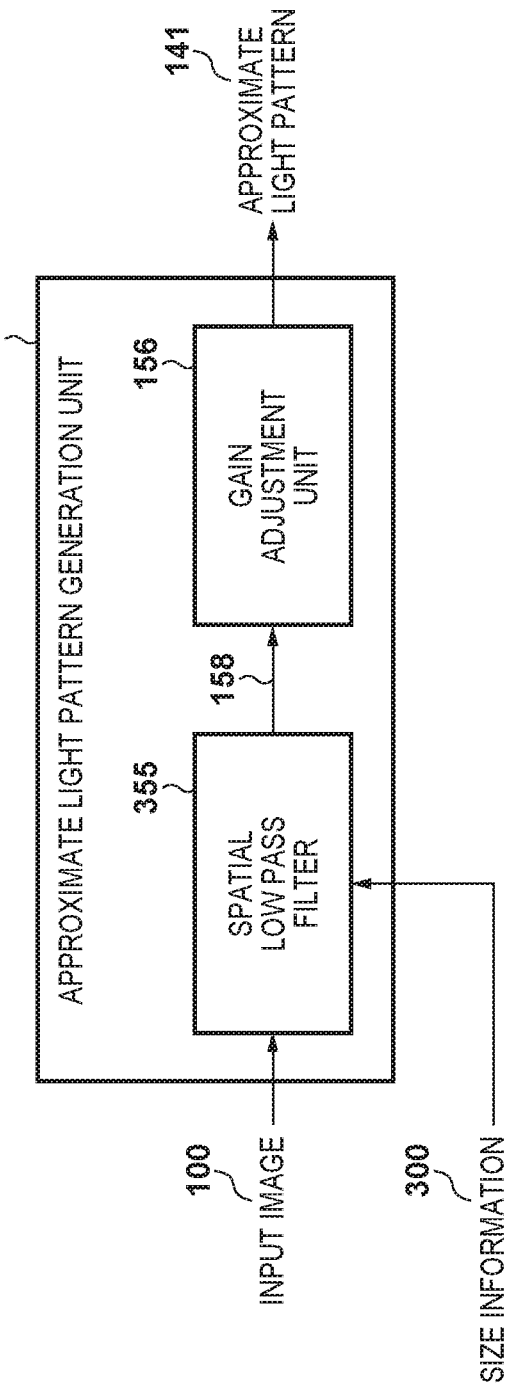

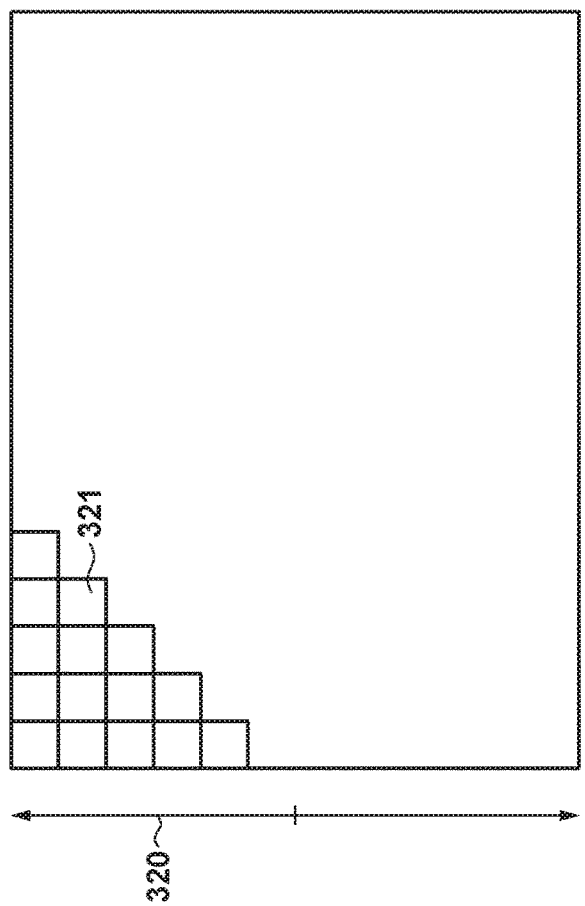

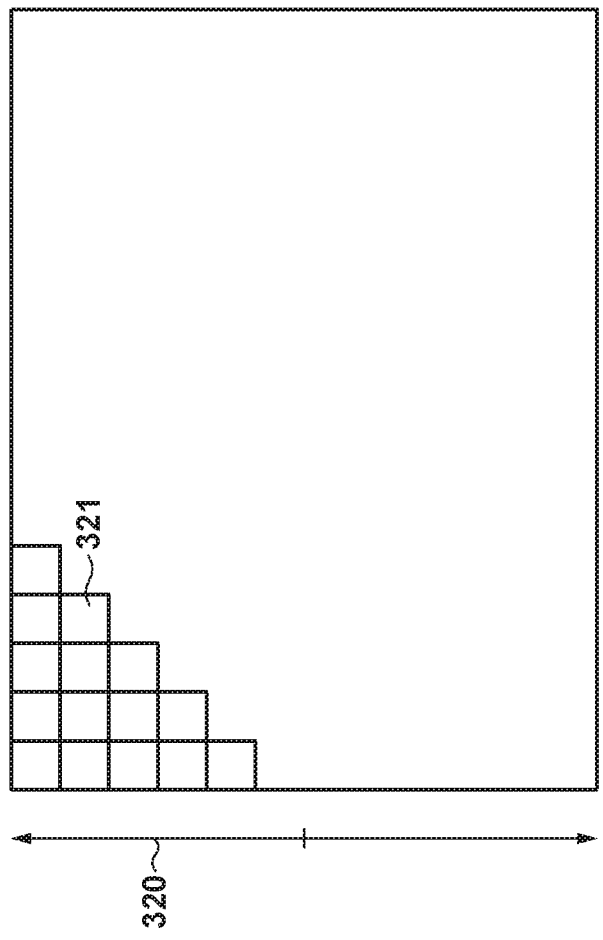
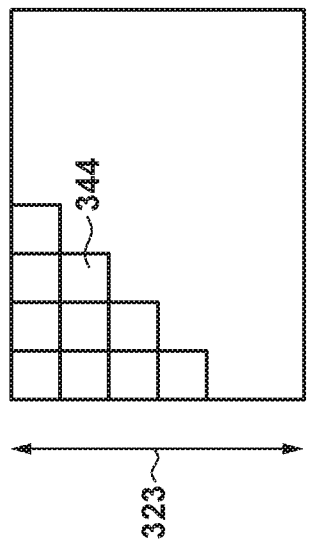

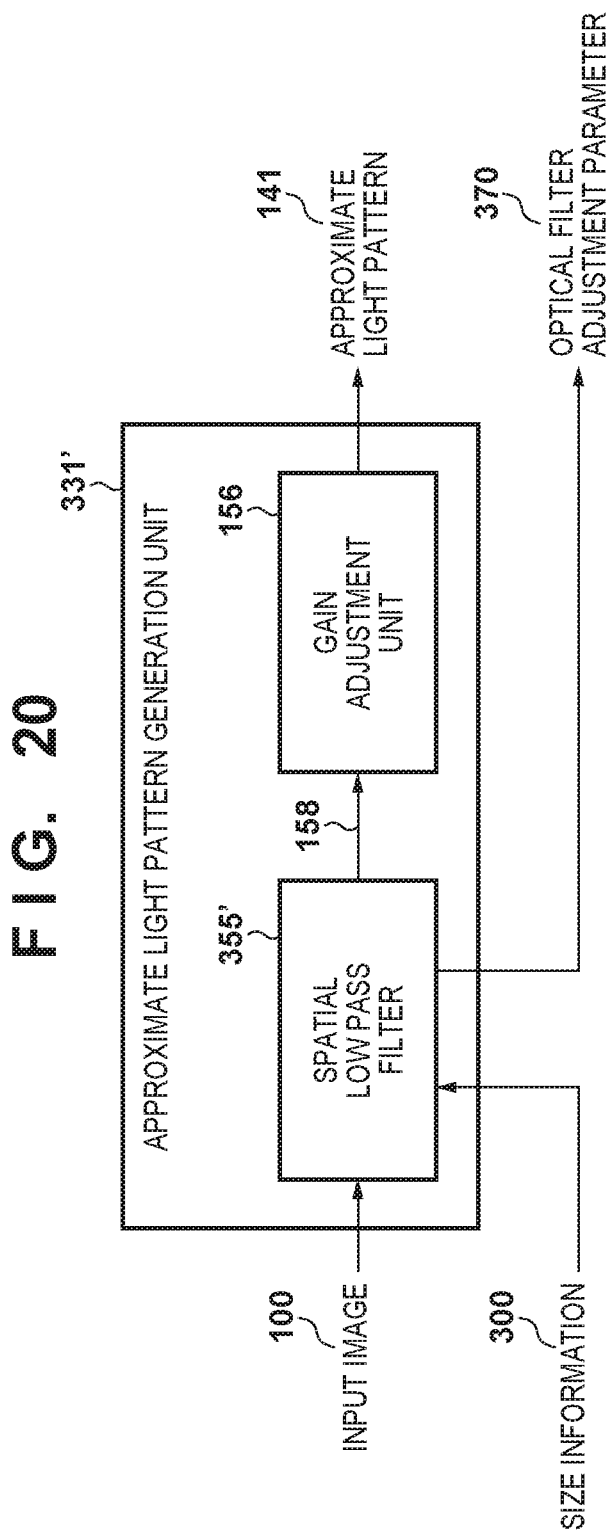

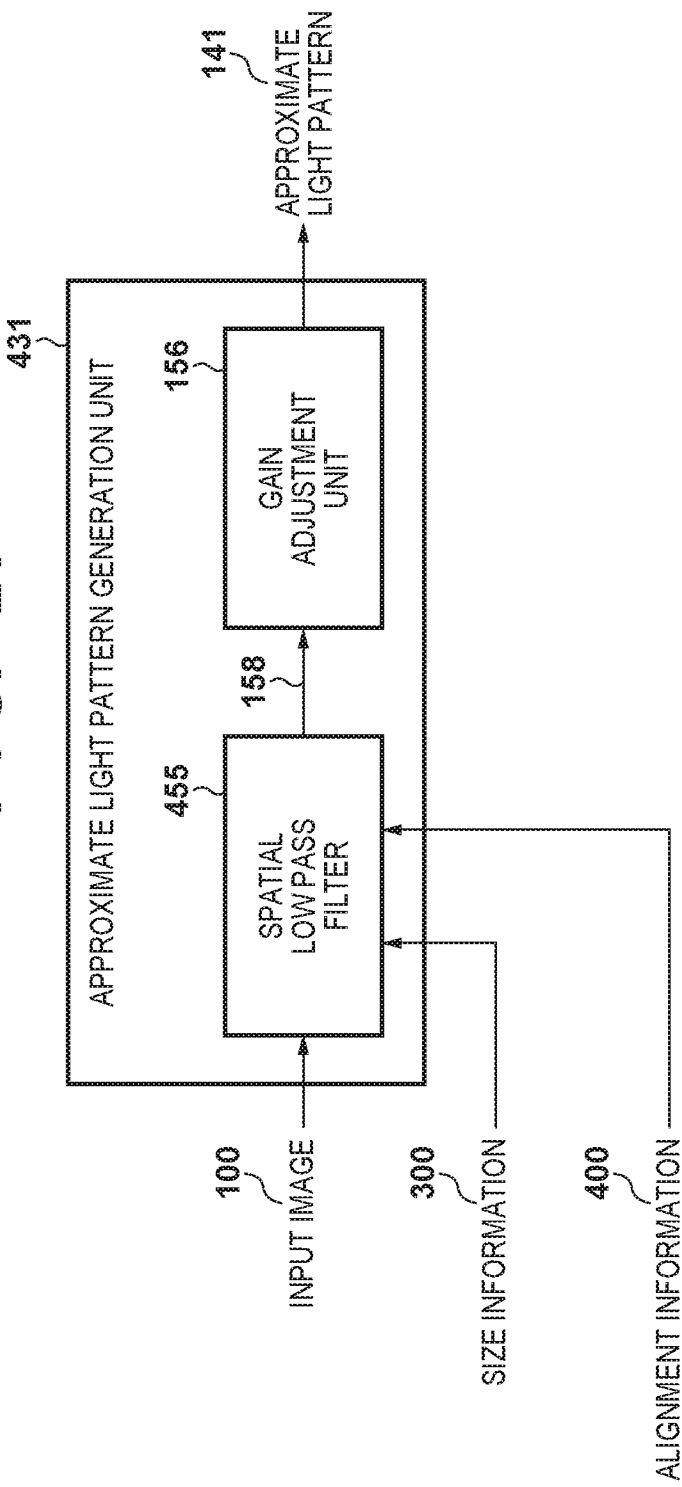

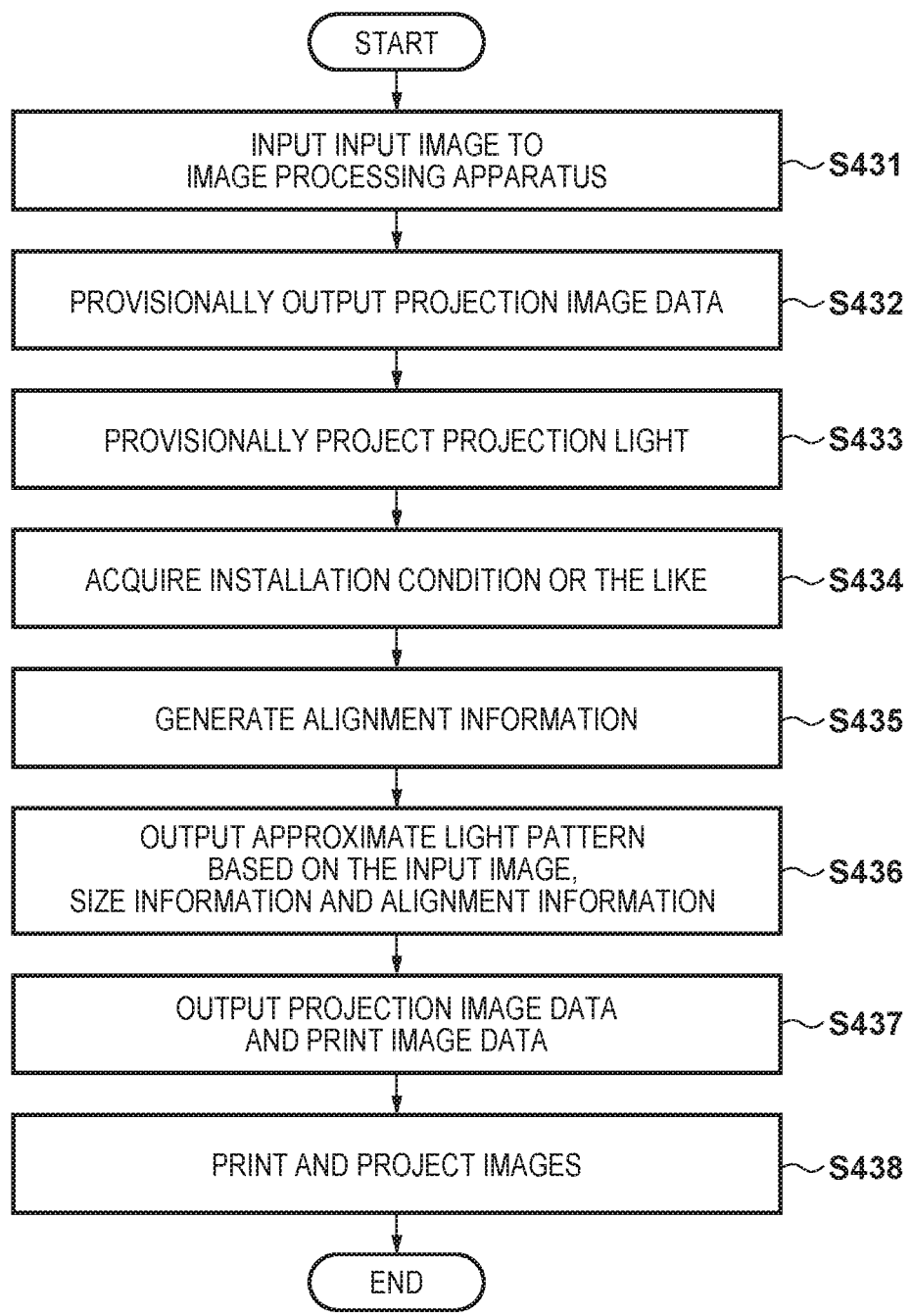

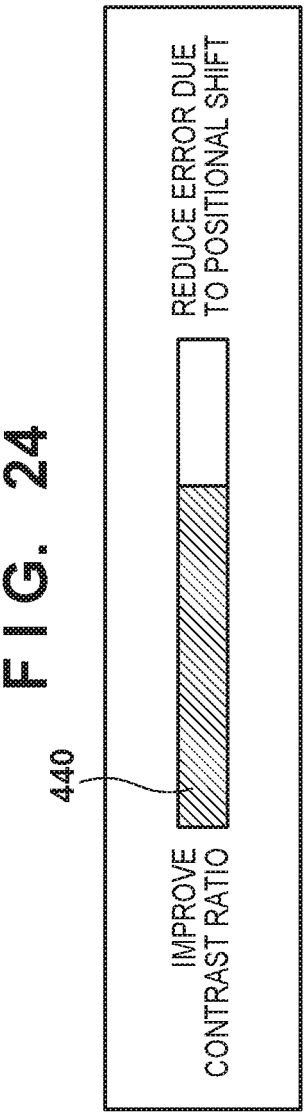
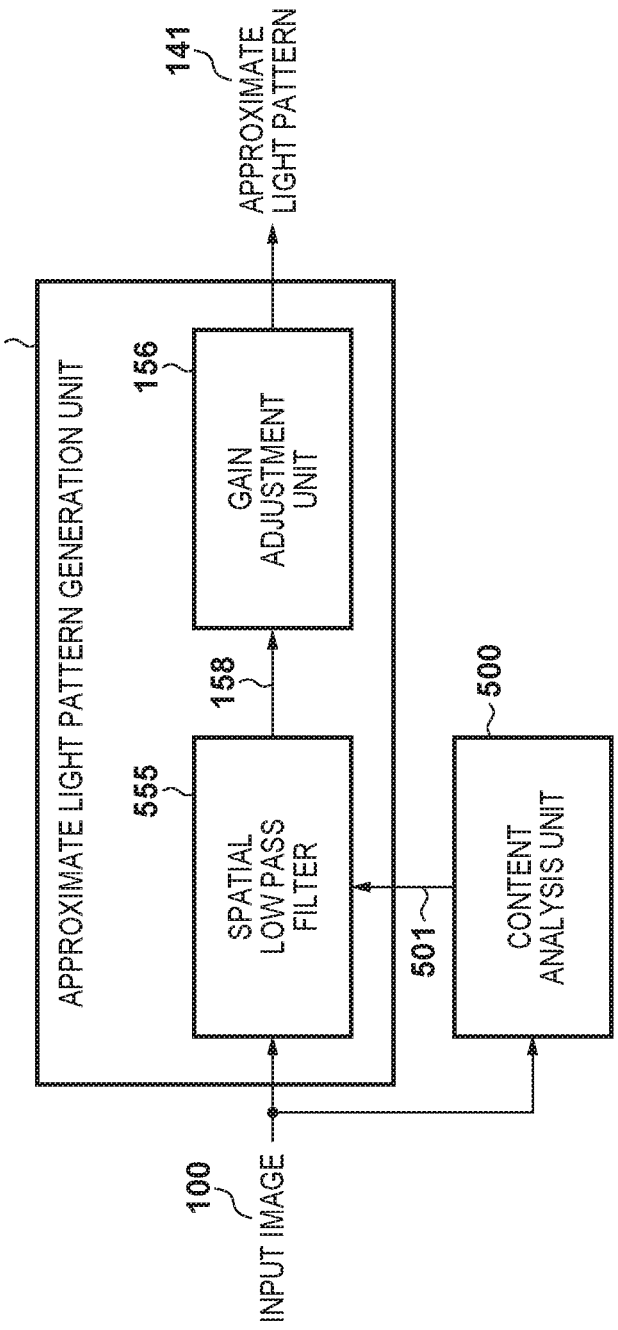

F I G. 26A
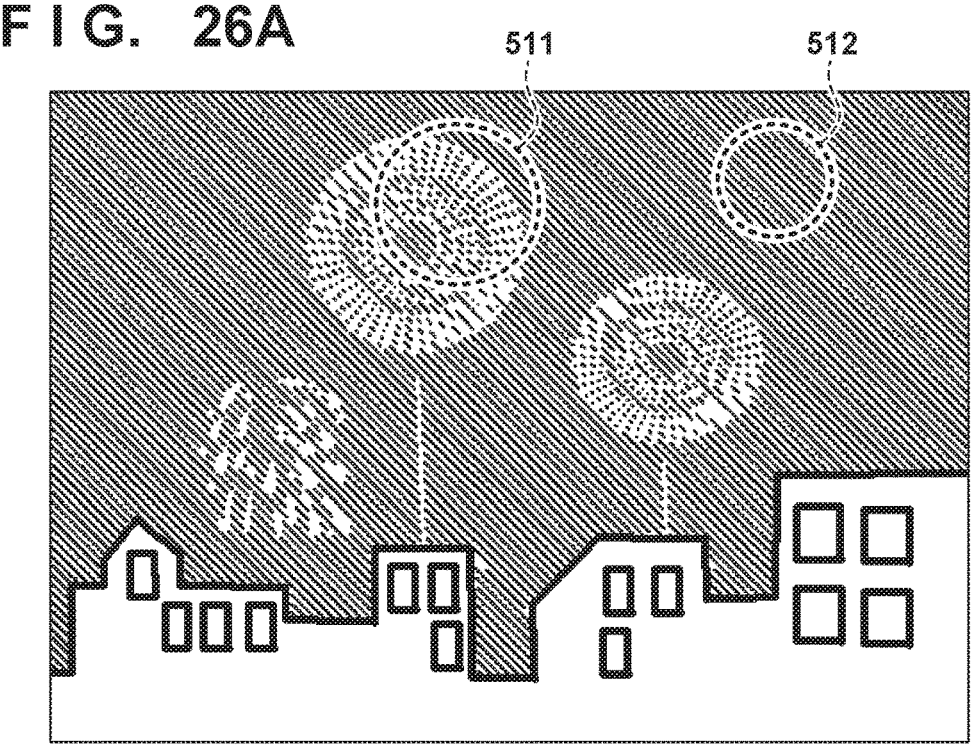
F I G. 26B
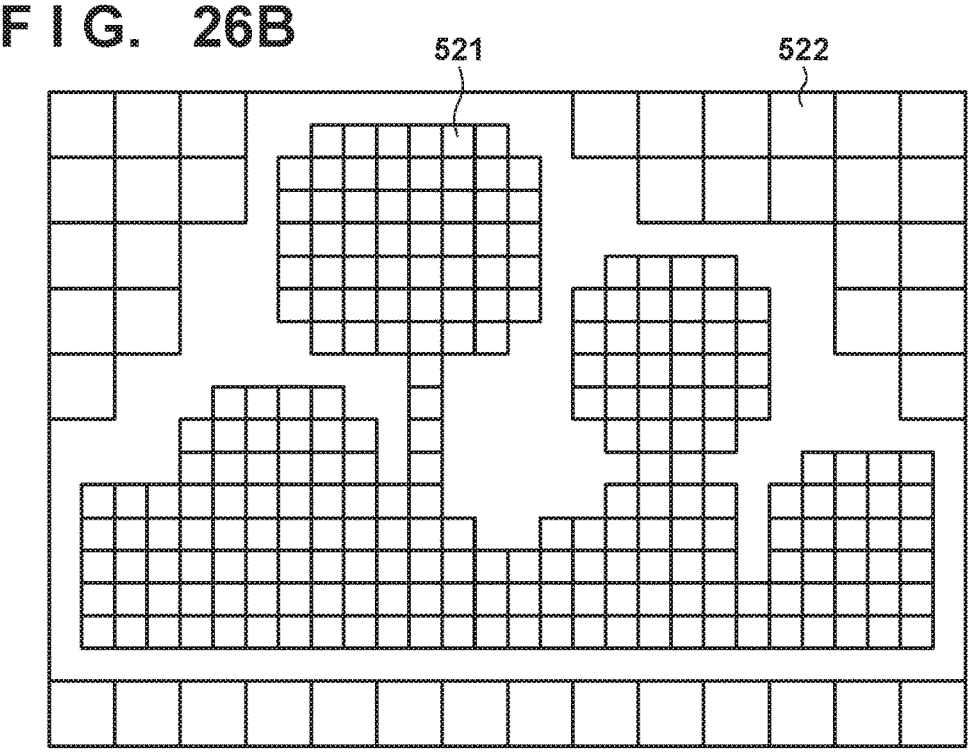

IMAGE PROCESSING APPARATUS AND METHOD, IMAGE PROJECTION APPARATUS, PRINTING APPARATUS, AND IMAGE PRINTING AND PROJECTION SYSTEM

BACKGROUND OF THE INVENTION

Field of the Invention

The present invention relates to an image processing apparatus and method, an image projection apparatus, a printing apparatus, and an image printing and projection system, and more particularly to a technique for superimposing a printed matter and a projected image.

Description of the Related Art

A printed matter printed with a printing apparatus such as an inkjet printer, an offset printer or the like is usually viewed under a viewing environment light such as ceiling lighting. In other words, printed matter is illuminated with a viewing environment light, and a user observes the reflected light of the printed matter. Therefore, the dynamic range of the display luminance of the printed matter is determined by the brightness of the viewing environment light, the reflectance of the paper, and print quality.

On the other hand, in recent years, dynamic range expansion technology called HDR (High Dynamic Range) control has rapidly advanced in image sensing apparatuses that take pictures. Japanese Patent Application Laid-Open No. 2016-174315 discloses a technique in which an image signal from an image sensor such as a CMOS sensor is processed while compressing luminance as low as possible so that the reproducibility of the luminance, color, and contrast ratio approach the dynamic range of the human eye.

In addition, Japanese Patent No. 5153566 discloses a technique of performing HDR viewing of an HDR image using a printed matter, wherein by projecting an image on a printed matter with a projector or the like and superimposing it on a printed image, display luminance and color dynamic range are increased. Since printed matter can be produced at a very low cost and high definition images can be printed, it is possible to display a high quality image with a lower cost than using a high resolution projector or a liquid crystal display compatible with HDR display. Specifically, by projecting an image on a black-based printed portion with a low reflectance by a projector or the like, the black luminance level is lowered and a contrast ratio that is several stages higher than a contrast ratio expressed by the projector alone can be expected, and therefore, it is suitable for HDR expression. Picture exhibition, advertisement, art, etc. are considered as applications of such a display method.

However, in a case where an image is projected onto a printed matter by a projector or the like and superposed on an image of the printed manner as described in Japanese Patent No. 5153566, if the spatial frequency (perceived resolution) of the projected image is low, the resultant image may be sometimes blurrier than expected.

SUMMARY OF THE INVENTION

The present invention has been made in consideration of the above situation, and in a case where an image is projected on a printed matter by an image projection apparatus and superimposed on an image of the printed matter, an image with desired display quality can be obtained regardless of the spatial frequency of the projected image.

According to the present invention, provided is an image processing apparatus comprising: a first generation unit that generates approximate light pattern by adjusting spatial frequency of an input image, and generates a projection image data based on the approximate light pattern; and a second generation unit that generates a print image data based on the input image, wherein the second generation unit generates the print image data so that a difference between the input image and an image for observation obtained by superimposing projection light projected based on the projection image data onto a printed matter printed based on the print image data is reduced.

Further, according to the present invention, provided is an image processing apparatus comprising: a first generation unit that generates approximate light pattern by adjusting spatial frequency of an input image, and generates a first projection image data based on the approximate light pattern; and a second generation unit that generates a second projection image data based on the input image, wherein the second generation unit generates the second projection image data so that a difference between the input image and an image obtained by superimposing a projection light projected based on the first projection image data onto a projection light projected based on the second projection image data is reduced.

Furthermore, according to the present invention, provided is an image projection apparatus comprising: an image processing apparatus comprising: a first generation unit that generates approximate light pattern by adjusting spatial frequency of an input image, and generates a projection image data based on the approximate light pattern; and a second generation unit that generates a print image data based on the input image, wherein the second generation unit generates the print image data so that a difference between the input image and an image for observation obtained by superimposing projection light projected based on the projection image data onto a printed matter printed based on the print image data is reduced; and a projection unit that project light based on the projection image data output from the image processing apparatus.

Further, according to the present invention, provided is a printing apparatus comprising: an image processing apparatus comprising: a first generation unit that generates approximate light pattern by adjusting spatial frequency of an input image, and generates a projection image data based on the approximate light pattern; and a second generation unit that generates a print image data based on the input image, wherein the second generation unit generates the print image data so that a difference between the input image and an image for observation obtained by superimposing projection light projected based on the projection image data onto a printed matter printed based on the print image data is reduced; and a printing unit that performs printing based on the print image data output from the image processing apparatus.

Further, according to the present invention, provided is an image printing and projection system comprising: an image processing apparatus comprising: a first generation unit that generates approximate light pattern by adjusting spatial frequency of an input image, and generates a projection image data based on the approximate light pattern; and a second generation unit that generates a print image data based on the input image, wherein the second generation unit generates the print image data so that a difference between the input image and an image for observation obtained by superimposing projection light projected based on the projection image data onto a printed matter printed based on the print image data is reduced; a projection apparatus that projects light based on the projection image data output from the image processing apparatus; and a printing apparatus that performs printing based on the print image data output from the image processing apparatus.

Further, according to the present invention, provided is an image processing method comprising: generating approximate light pattern by adjusting spatial frequency of an input image, and generating a projection image data based on the approximate light pattern; and generating a print image data based on the input image, wherein the print image data is generated so that a difference between the input image and an image for observation obtained by superimposing projection light projected based on the projection image data onto a printed matter printed based on the print image data is reduced.

Further, according to the present invention, provided is an image processing apparatus comprising: generating approximate light pattern by adjusting spatial frequency of an input image, and generating a first projection image data based on the approximate light pattern; and generating a second projection image data based on the input image, wherein the second projection image data is generated so that a difference between the input image and an image obtained by superimposing a projection light projected based on the first projection image data onto a projection light projected based on the second projection image data is reduced.

Further, according to the present invention, provided is a non-transitory storage medium readable by a computer, the storage medium storing a program that is executable by the computer, wherein the program includes program code for causing the computer to function as an image processing apparatus comprising: a first generation unit that generates approximate light pattern by adjusting spatial frequency of an input image, and generates a projection image data based on the approximate light pattern; and a second generation unit that generates a print image data based on the input image, wherein the second generation unit generates the print image data so that a difference between the input image and an image for observation obtained by superimposing projection light projected based on the projection image data onto a printed matter printed based on the print image data is reduced.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 3 is a block diagram showing a configuration of an image processing apparatus and a relationship between input/output signals according to a first embodiment;

FIG. 13 is a block diagram showing an example of a configuration of an approximate light pattern generation unit according to a third embodiment;

FIGS. 17A and 17B are schematic diagrams showing relationship between an actual display size and spatial frequency in a case where a spatial frequency is not changed;

FIGS. 19A and 19B show schematic diagrams showing the actual display size and the spatial frequency according to the third embodiment;

FIG. 20 is a block diagram showing an example of another configuration of the approximate light pattern generation unit according to the third embodiment;

FIG. 21 is a block diagram showing an example of a configuration of an approximate light pattern generation unit according to a fourth embodiment;

FIG. 23 is a flowchart showing the processing procedure according to the fourth embodiment;

FIG. 24 is a diagram showing an example of a GUI in a case where the spatial frequency is determined in response to a user's request according to the fourth embodiment;

FIG. 25 is a block diagram showing an example of a configuration of an approximate light pattern generation unit and a peripheral unit according to a fifth embodiment;

FIG. 26A is a diagram showing an example of an input image according to the fifth embodiment; and FIG. 26B is a schematic diagram showing an in-plane distribution of spatial frequency of a projected image according to the fifth embodiment.

DESCRIPTION OF THE EMBODIMENTS

Exemplary embodiments of the present invention will be described in detail in accordance with the accompanying drawings. The dimensions, shapes and relative positions of the constituent parts shown in the embodiments should be changed as convenient depending on various conditions and on the structure of the apparatus adapted to the invention, and the invention is not limited to the embodiments described herein.

<First Embodiment>

Figure 1A:
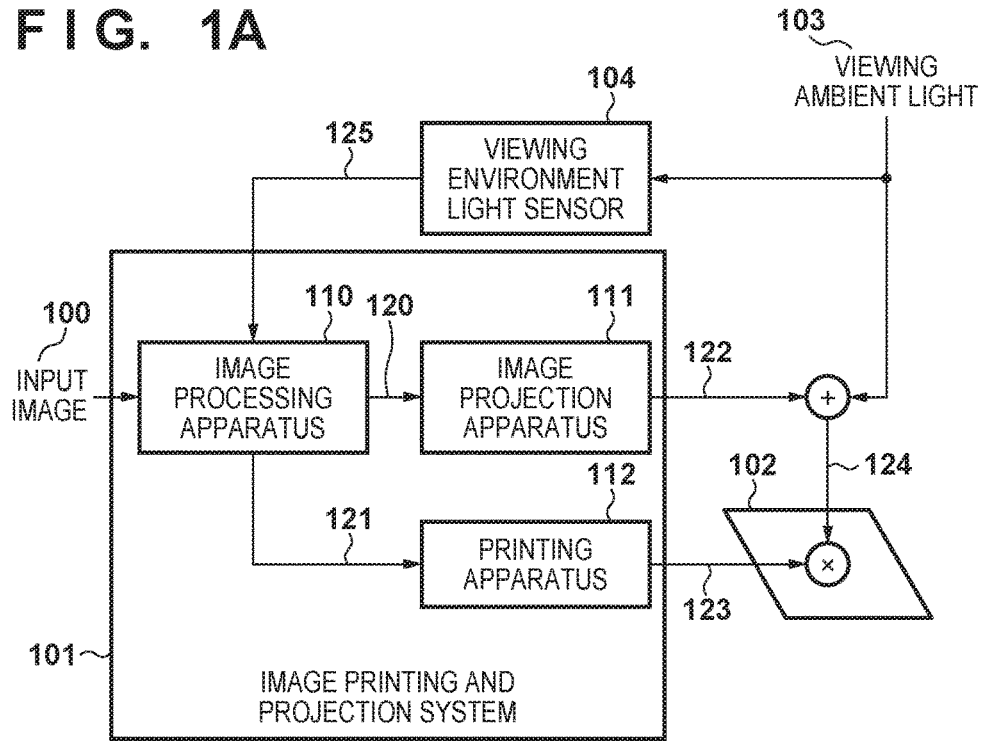
FIG. 1A is a block diagram showing a configuration of an image printing and projection system and a relationship between input/output signals according to an embodiment of the present invention.

An image printing and projection system according to a first embodiment of the present invention will be described below. FIG. 1A is a block diagram showing a configuration of the image printing and projection system 101 and a relationship between input/output signals according to the first embodiment. In the first embodiment, in order to view images, an input image 100, the image printing and projection system 101, a sheet to be printed, and a viewing environment light sensor 104 are required.

The image printing and projection system 101 is composed of an image processing apparatus 110, an image projection apparatus 111, and a printing apparatus 112. The image processing apparatus 110 is constituted by, inter alia, an information terminal such as a personal computer or a smartphone, and software. The image projection apparatus 111 is a projector or the like, that optically projects an image. The printing apparatus 112 is, for example, an ink jet printer, an offset printer, and so forth.

The viewing environment light sensor 104 detects viewing environment light 103 reflected by vacant unprinted paper temporarily placed in the place where an image is to be displayed. As the viewing environment light sensor 104, a camera that detects a luminance distribution of a region is used, and viewing environment light data 125 based on the detected viewing environment light 103 is output. However, a luminance sensor that detects luminance at a single point may be more conveniently used as the viewing environment light sensor 104, or if an image is appreciated under an environment where little viewing environment light enters, the viewing environment light sensor 104 may not be used. In the present embodiment, in a case where a camera is used as the viewing environment light sensor 104, the luminance distribution of the paper is photographed. The viewing environment light sensor 104 is connected to the image processing apparatus 110 of the image printing and projection system 101, and the outputs viewing environment light data 125.

In the above configuration, when the input image 100 is input to the image processing apparatus 10 of the image printing and projection system 101, the image processing apparatus 110 generates and outputs a projection image data 120 and a print image data 121 in accordance with the input image 100 and the viewing environment light data 125. The details of this process will be described later. The projection image data 120 is input to the image projection apparatus 111, and projection light 122 is output. On the other hand, when the print image data 121 is input to the printing apparatus 112, printing process 123 is performed on the paper, and a printed matter 102 is produced. Then, the projection light 122 and the viewing environment light 103 are projected onto the printed matter 102 as light 124, and superimposed on a printed image.

Figure 1B:
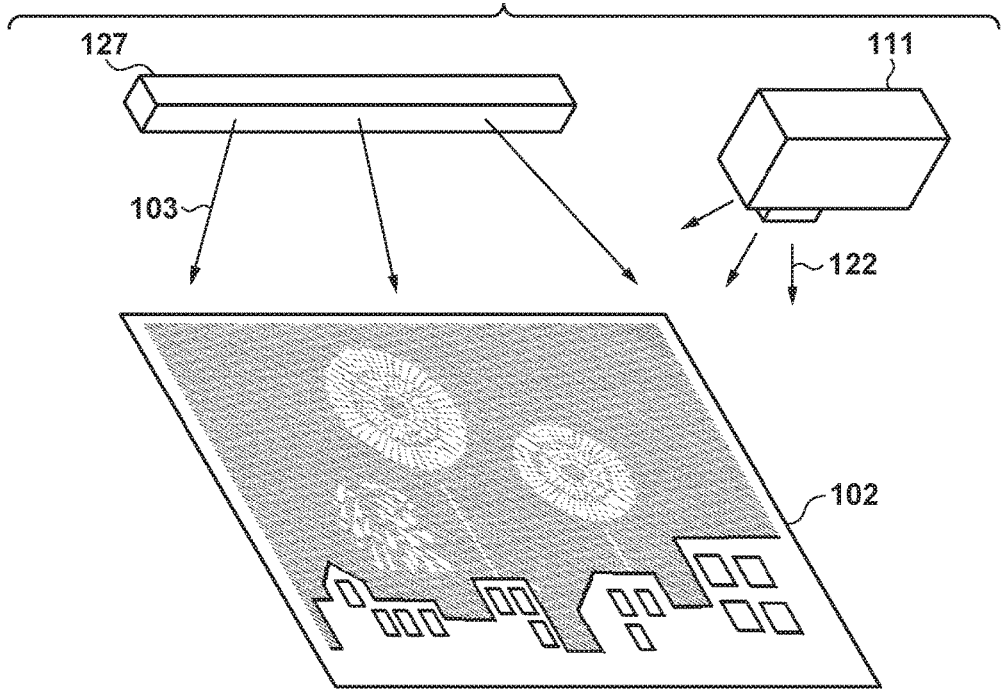
FIG. 1B is a schematic diagram showing an example of a state in which an image is displayed by the image printing and projection system according to the embodiment.

FIG. 1B is a schematic diagram showing an example of a state in which an image (viewing image) is exhibited by the image printing and projection system 101. The projection light 122 is projected on the printed matter 102 from the image projection apparatus 111. In addition, the viewing environment light 103 is irradiated from ceiling lighting 127. As a result, the user views the reflected light of the printed matter 102 illuminated by the projection light 122 and the viewing environment light 103.

Figure 2:
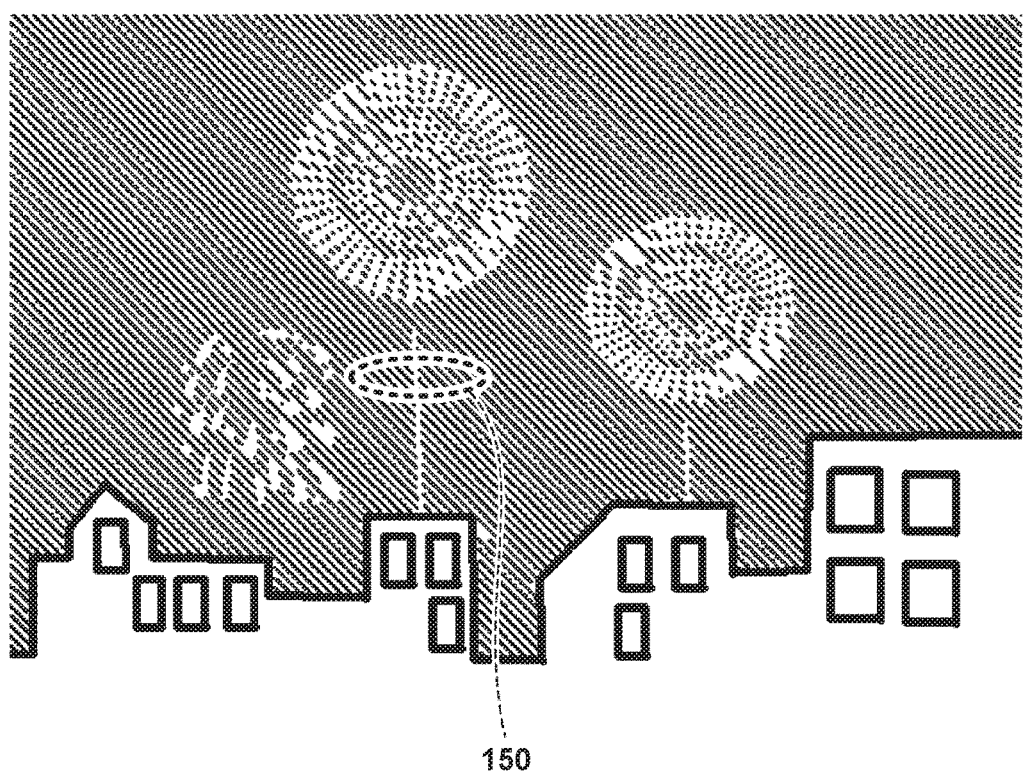
FIG. 2 is a diagram showing an example of an input image according to the present embodiment.

FIG. 2 is a view showing an example of the input image 100 in the present embodiment which shows a night view of a cityscape and fireworks sparkling in the night sky. An image photographed under the HDR control includes gradation data of a high dynamic range processed with the least luminance compression. As such gradation processing, a PQ curve is well known, and the PQ curve is used here. In the input image 100, for example, luminance of 0.01 cd/m$^2$ is allocated in the dark part and luminance of 1,000 cd/m$^2$ is allocated in the high luminance part.

FIG. 3 is a block diagram showing a configuration of the image processing apparatus 110 and the relationship between input/output signals in the first embodiment. As described above, the input image 100) and the viewing environment light data 125 are input to the image processing apparatus 110. The image processing apparatus 110 includes a CPU, a memory circuit, software, and the like (not shown). The process of generating the projection image data 120 and the print image data 121 from the input image 100 and the viewing environment light data 125 will be described below with reference to FIG. 3.

The input image 100 is input to an approximate light pattern generation unit 131, and the approximate light pattern generation unit 131 generates an approximate light pattern 141 having a lower spatial frequency (perceived resolution) than the input image 100 while approximating the input image 100.

Figure 4A:
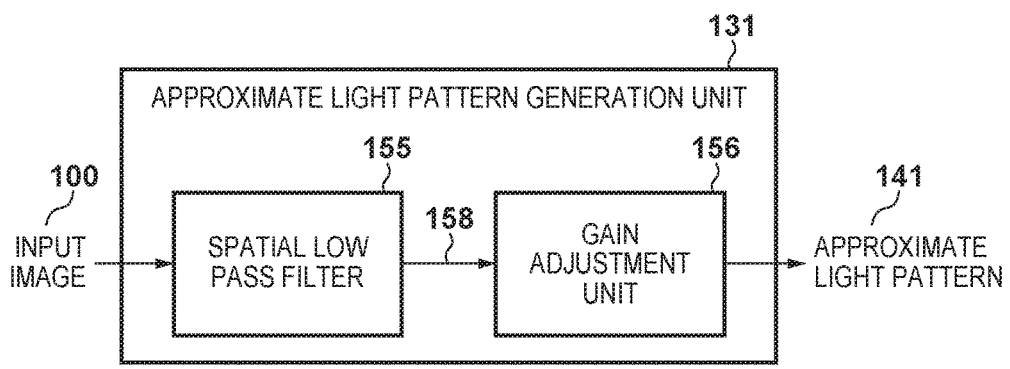
FIG. 4A is a block diagram showing a configuration example of an approximate light pattern generation unit according to the first embodiment.

FIG. 4A is a block diagram showing an example of a configuration of the approximate light pattern generation unit 131 in the first embodiment. The spatial frequency of the input image 100 is lowered by a spatial low pass filter 155. Next, an image 158 output from the spatial low pass filter 155 is input to a gain adjustment unit 156, and the gain adjustment unit 156 adjusts the luminance with a gain based on a user set value, for example. Alternatively, the luminance may be automatically adjusted according to the luminance expressible by the image projection apparatus 111 to be used and the maximum luminance assigned to the input image 100, for example. As a result, the approximate light pattern 141 is output from the gain adjustment unit 156. Although not shown in FIG. 4A, processing of extracting and outputting only luminance information of the input image 100 which is a color image may be performed. Such processing is suitable, for example, in a case where a high efficiency monochromatic projector that modulates only luminance is used as an image projection apparatus 111.

Figure 4B:
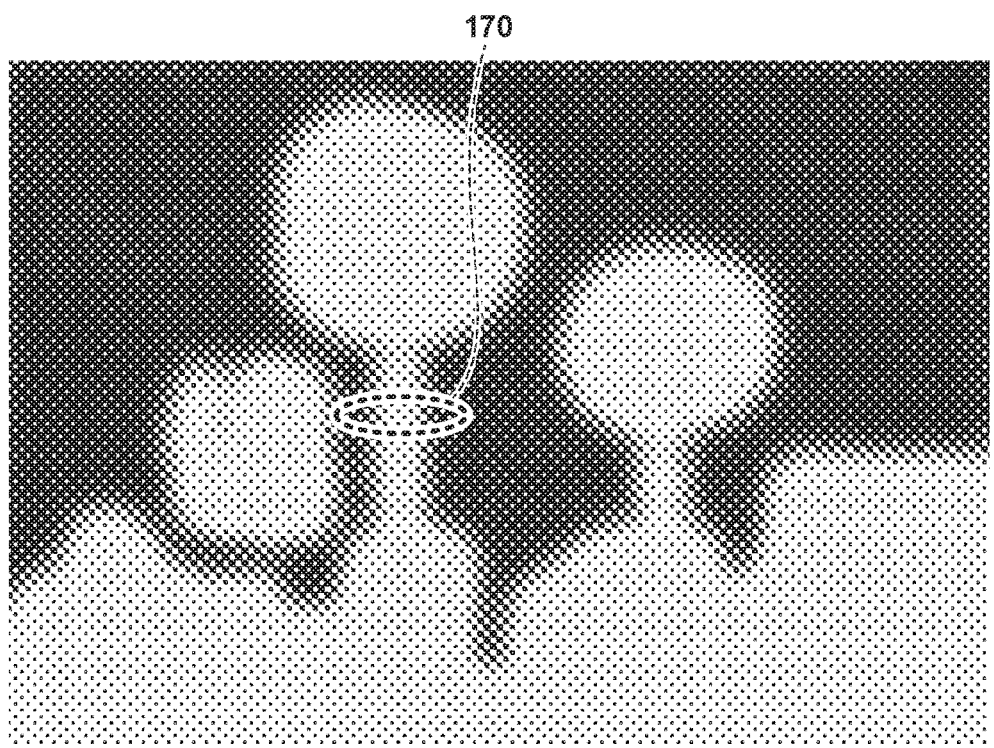
FIG. 4B is a diagram showing an example of an approximate light pattern according to the first embodiment.

FIG. 4B is a diagram showing an example of the approximate light pattern 141 in the first embodiment. Comparing to the input image 100 shown in FIG. 2, the spatial frequency of the approximate light pattern 141 is low, and the details of fireworks and cityscape, for example, have disappeared.

The approximate light pattern 141 generated in this way is input to a projection image output unit 132 and a synthesized pattern generation unit 134. The projection image output unit 132 appropriately converts the approximate light pattern 141 into a format that can be processed by the image projection apparatus 111, and outputs the projection image data 120.

On the other hand, the viewing environment light data 125 is input to a non-approximate light pattern generation unit 133. As described above, the viewing environment light data 125 includes the luminance distribution of the paper when photographed with a camera. The non-approximate light pattern generation unit 133 crops the viewing environment light data 125 into image data having the brightness distribution only within the sheet. Further, the non-approximate light pattern generation unit 133 performs conversion processing so that the resolution of the image data becomes the same as the resolution of the input image 100 and that the pixel position on the image data corresponds to the position on the sheet.

Next, gradation is assigned to the PQ curve that is based on the actual luminance information using camera sensitivity setting at the time of shooting by the viewing environment light sensor 104 so that the PQ curve can be handled in the same way as the input image 100 similarly assigning gradation to the PQ curve, and outputs the PQ curve as a non-approximate light pattern 143. In a case where a luminance sensor that detects luminance at a single point is used as the viewing environment light sensor 104, luminance information of the single point (for example, the center portion of the paper) is output as the non-approximate light pattern 143 whose luminance is uniform over the paper.

Figure 5:
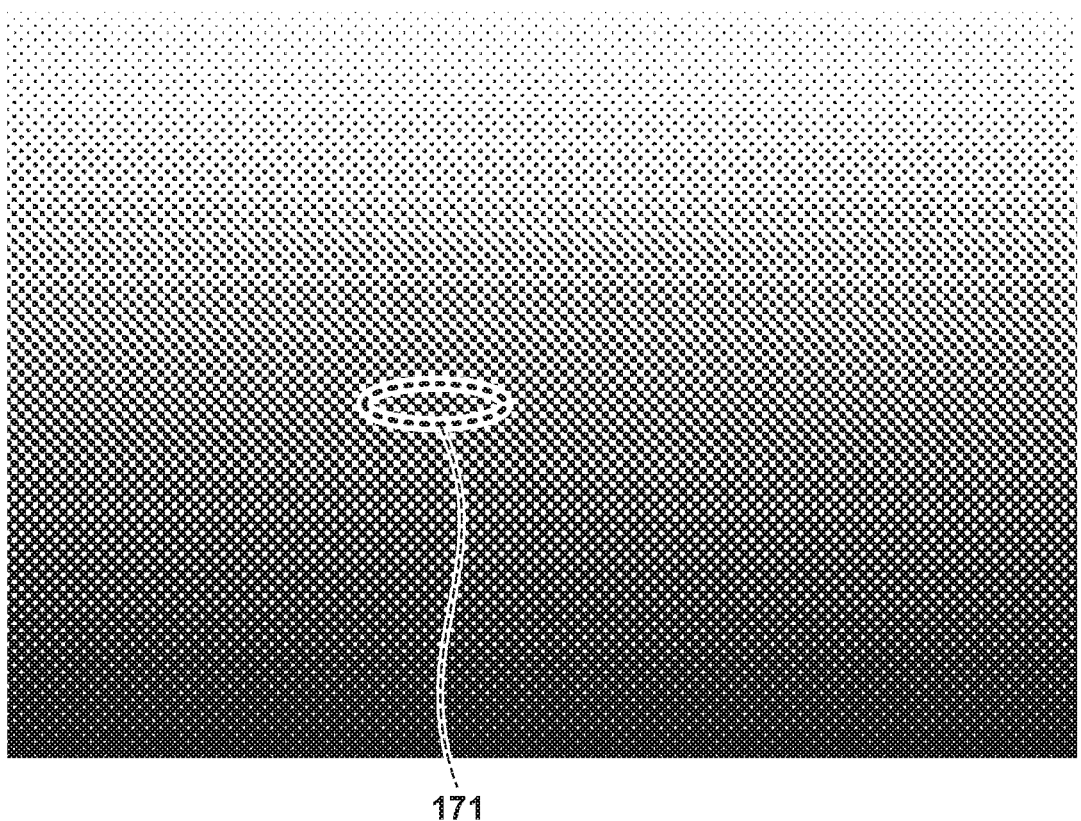
FIG. 5 is a diagram showing an example of a non-approximate light pattern according to the first embodiment.

FIG. 5 is an image diagram showing an example of the non-approximate light pattern 143 in the present embodiment. Of course, it is not close to the input image 100 shown in FIG. 2 and is a pattern of the viewing environment light 103 irradiated from the ceiling lighting 127. For example, as shown in FIG. 5, the upper part in the plane has a brighter gradation. The non-approximate light pattern 143 is input to the synthesized pattern generation unit 134.

Figure 6A:
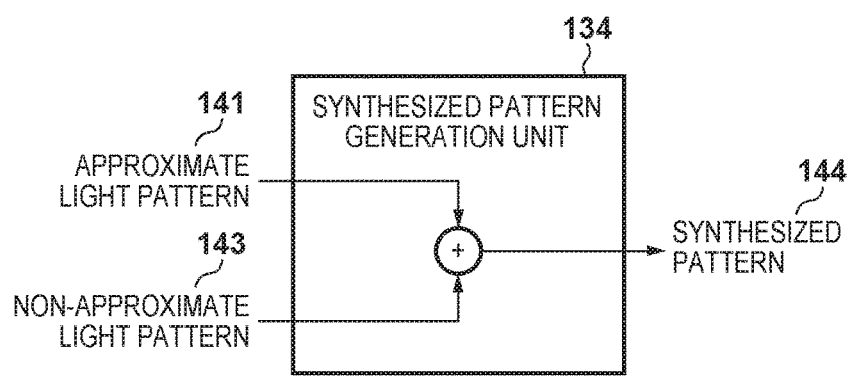
FIG. 6A is a block diagram illustrating a configuration example of a synthesized pattern generation unit according to the first embodiment.
Figure 6B:
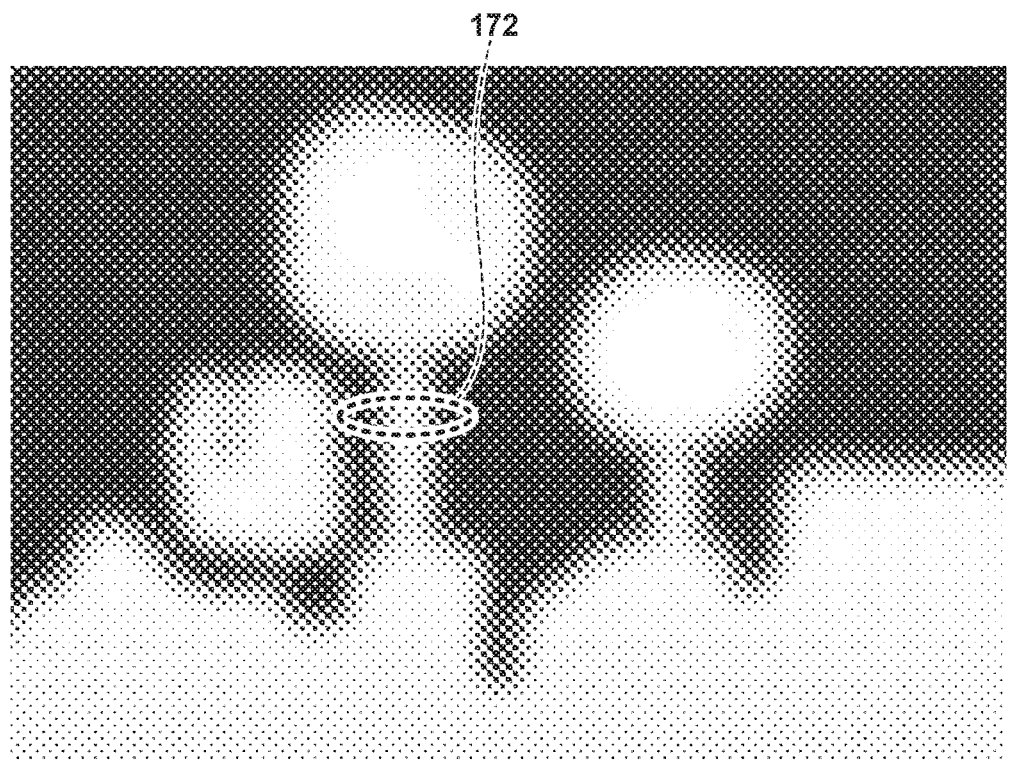
FIG. 6B is a diagram showing an example of a synthesized pattern according to the first embodiment.

FIG. 6A is a block diagram showing an example of a configuration of the synthesized pattern generation unit 134 in the first embodiment. Pixel values of the approximate light pattern 141 and pixel values of the non-approximate light pattern 143 input to the synthesized pattern generation unit 134 are added for each pixel position, and the result is output as a synthesized pattern 144. FIG. 6B is a diagram showing an example of the synthesized pattern 144 in the first embodiment, in which the approximate light pattern 141 shown in FIG. 4B and the non-approximate light pattern 143 shown in FIG. 5 are added for each pixel position.

Figure 7A:
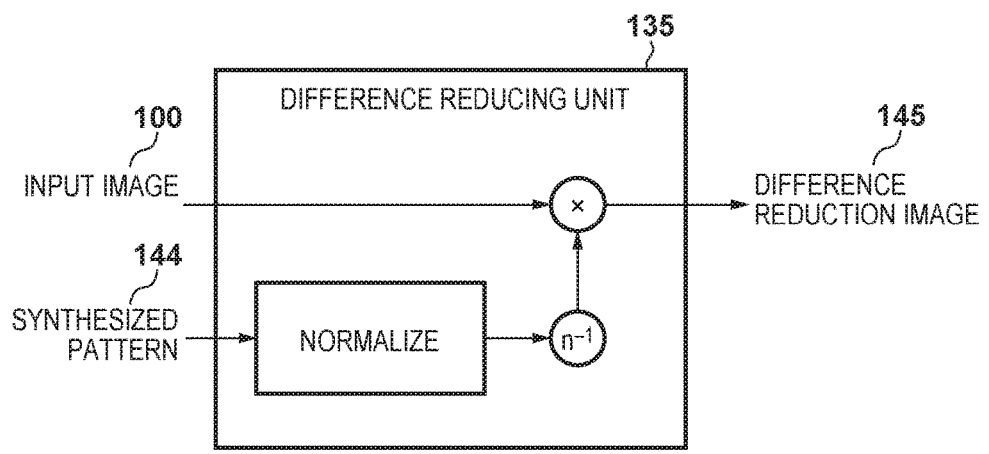
FIG. 7A is a block diagram illustrating a configuration example of a difference reduction processing unit according to the first embodiment.

The synthesized pattern 144 generated as described above and the input image 100 are input to a difference reducing unit 135. FIG. 7A is a block diagram showing an example of a configuration of the difference reducing unit 135 in the first embodiment. First, the pixel values of the synthesized pattern 144 are normalized to obtain brightness for each pixel position. Next, the pixel values of the input image 100 are divided by the brightness of the synthesized pattern 144 normalized for each pixel position, and the result is output as a difference reduction image 145. For example, assume that the pixel value of a certain pixel of the input image 100 is 100 thousandths and the pixel value of the same pixel of the synthesized pattern 144 is 200 thousandths. In this case, the brightness of the normalized synthesized pattern 144 is 0.2. When the pixel value 100 thousandths of the input image 100 is divided by 0.2, the pixel value of the difference reduction image 145 is 500 thousandths. The difference reduction image 145 is gradation data to be used for determining print gradation, which is 0.5 in brightness (reflectance in printing). Since the pixel value of the input image 100 was originally 100 thousandths, while the pixel value of the synthesized pattern 144 was 200 thousandths, it would be understood that the difference can be reduced (to zero) by setting the reflectance of printing to 0.5.

Figure 7B:
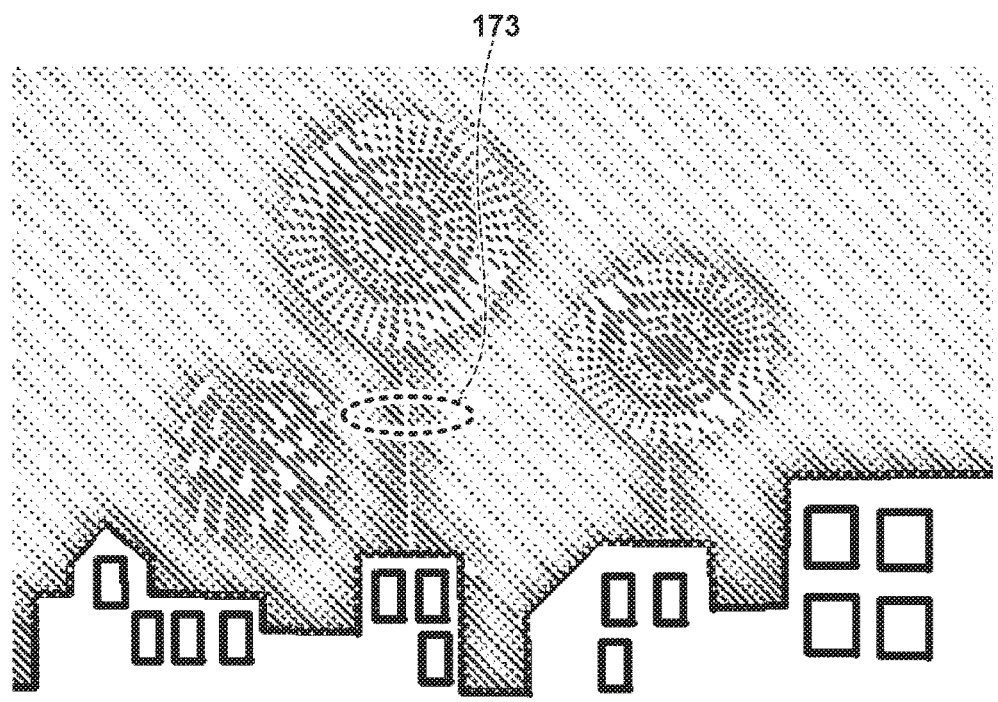
FIG. 7B is a diagram showing an example of a difference reduction image according to the first embodiment.

FIG. 7B is a diagram showing an example of the difference reduction image 145 in the present embodiment. The difference reduction image 145 is an image determined such that the difference between an image obtained when the synthesized pattern 144 of FIG. 6B is projected and superimposed on the printed matter 102 and the input image 100 becomes smaller.

The difference reduction image 145 generated by the different reducing unit 135 as described above is input to a print image output unit 136. The print image output unit 136 appropriately converts the difference reduction image 145 into a format that can be processed by the printing apparatus 112, and outputs a print image data 121. For example, the print image output unit 136 converts RGB image data to CYMK printing image data and outputs it.

Figure 8A:
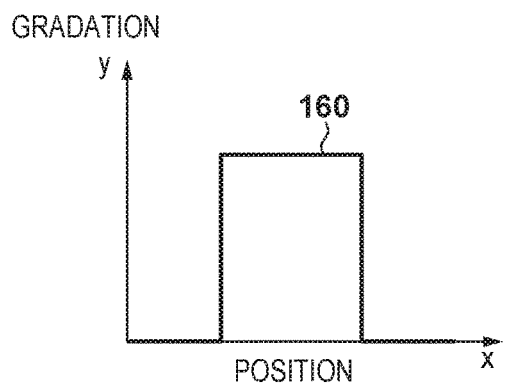
FIGS. 8A to 8F are graphs showing examples of gradation distribution of image data in a same region according to the first embodiment.

FIGS. 8A to 8F are graphs showing examples of gradation distribution of image data in the same region according to the first embodiment, in which the x-axis represents the position in the horizontal direction of the image, and the y-axis represents the gradation (luminance). FIG. 8A shows the gradation distribution in a region 150 of the input image 100 shown in FIG. 2. Here, the curve 160 is such that the dark portion and the high luminance portion are switched to form a rectangular shape.

Figure 8D:
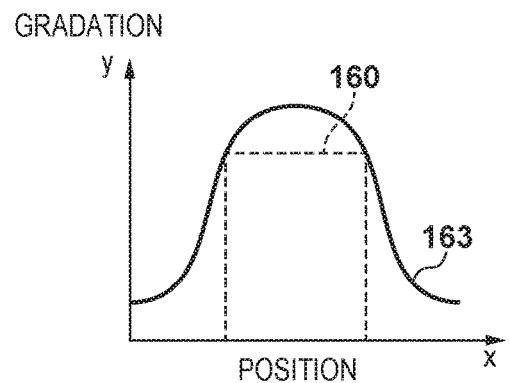
Figure 8B:
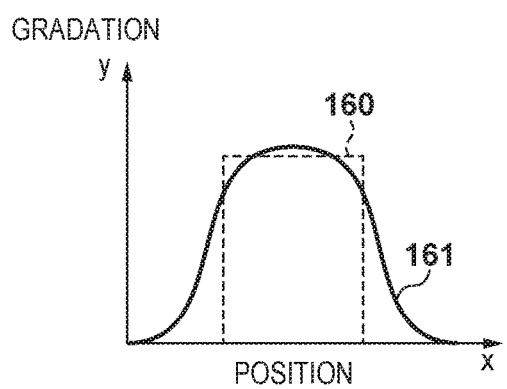

FIG. 8B shows the gradation distribution in a region 170 of the approximate light pattern 141 shown in FIG. 4B. In this case, the spatial frequency of the curve 160 shown in FIG. 8A is lowered to form a curve 161 having no edge.

Figure 8E:
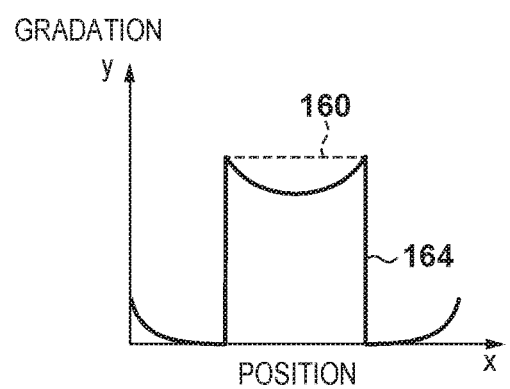
Figure 8C:
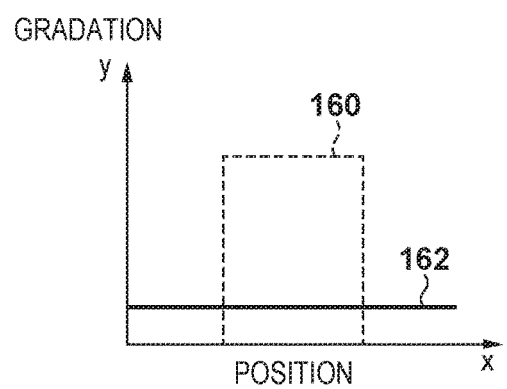

FIG. 8C shows the gradation distribution in a region 171 of the non-approximate light pattern 143 shown in FIG. 5. Here, the gradation does not substantially change irrespective of the position in the horizontal direction, and a curve 162 is not similar to the curve 160.

FIG. 8D shows the gradation distribution of a region 172 of the synthesized pattern 144 shown in FIG. 6B. A curve 163 is such that the curve 161 of the approximate light pattern 141 shown in FIG. 8B and the curve 162 of the non-approximate light pattern 143 shown in FIG. 8C are added for each position in the horizontal direction.

Figure 8F:
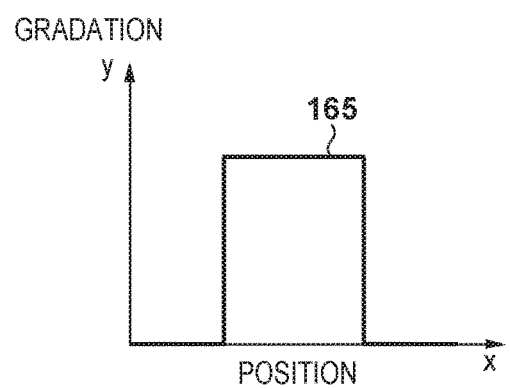

FIG. 8E shows the gradation distribution of a region 173 of the difference reduction image 145 shown in FIG. 7B. A curve 164 is determined such that the difference between an image obtained when the synthesized pattern 144 shown in FIG. 8D is projected and superimposed on the printed matter 102 and the input image 100 is reduced. FIG. 8F shows a curve 165 obtained when the pattern of the curve 163 is projected and superimposed on the printed matter 102 actually printed based on the curve 164, which is equivalent to the curve 160 of the input image 100.

As described above, by applying the present embodiment, it is possible to obtain an image of desired quality regardless of the spatial frequency of a projected image in a case where an image is projected and superimposed on a printed matter by an image projection apparatus.

It should be noted that in the above-described first embodiment, the image processing apparatus 110, the image projection apparatus 111, and the printing apparatus 112 of the image printing and projection system 101 are configured independently, however the present invention is not limited to this. For example, the image projection apparatus 111 or the printing apparatus 112 may be configured to include the image processing apparatus 110, or the image printing and projection system 101 may be configured as a single unit.

In the first embodiment, a configuration in which an image is projected onto a printed matter by an image projection apparatus has been described, but the present technology may be applied to other configurations. For example, the technique of the present invention can be applied to a case wherein projection images by two (or three or more) image projection apparatus are superimposed. More specifically, the print image output unit 136 shown in FIG. 3 is replaced by a second projection image output unit, and let the output of the second projection image output unit be a second projected image. In that case, the difference reducing unit 135 substitutionally performs calculation of subtracting the pixel value of the synthesized pattern 144 from the pixel value of the input image 100. By doing so, the image printing and projection system 101 shown in FIG. 1A can provide an image of desired quality to be displayed by adding the projection light 122, the viewing environment light 103 and the projection light based on the second projection image data.

<Second Embodiment>

Next, a second embodiment of the present invention will be described. In the first embodiment, a viewing condition in which the viewing environment light 103 does not change much is assumed as in a case where photographs and arts are exhibited indoors, for example. On the other hand, in the second embodiment, a configuration suitable for a case where the viewing environment light 103 changes will be described. Since the configuration and processing of the approximate light pattern generation unit 131 in the image processing apparatus 110 described with reference to FIG. 4A in the first embodiment are different from an approximate light pattern generation unit of the second embodiment, the differences will be described below. Since other configurations and processes are the same as those of the first embodiment, the same reference numerals are given and explanations thereof are omitted.

Figure 9:
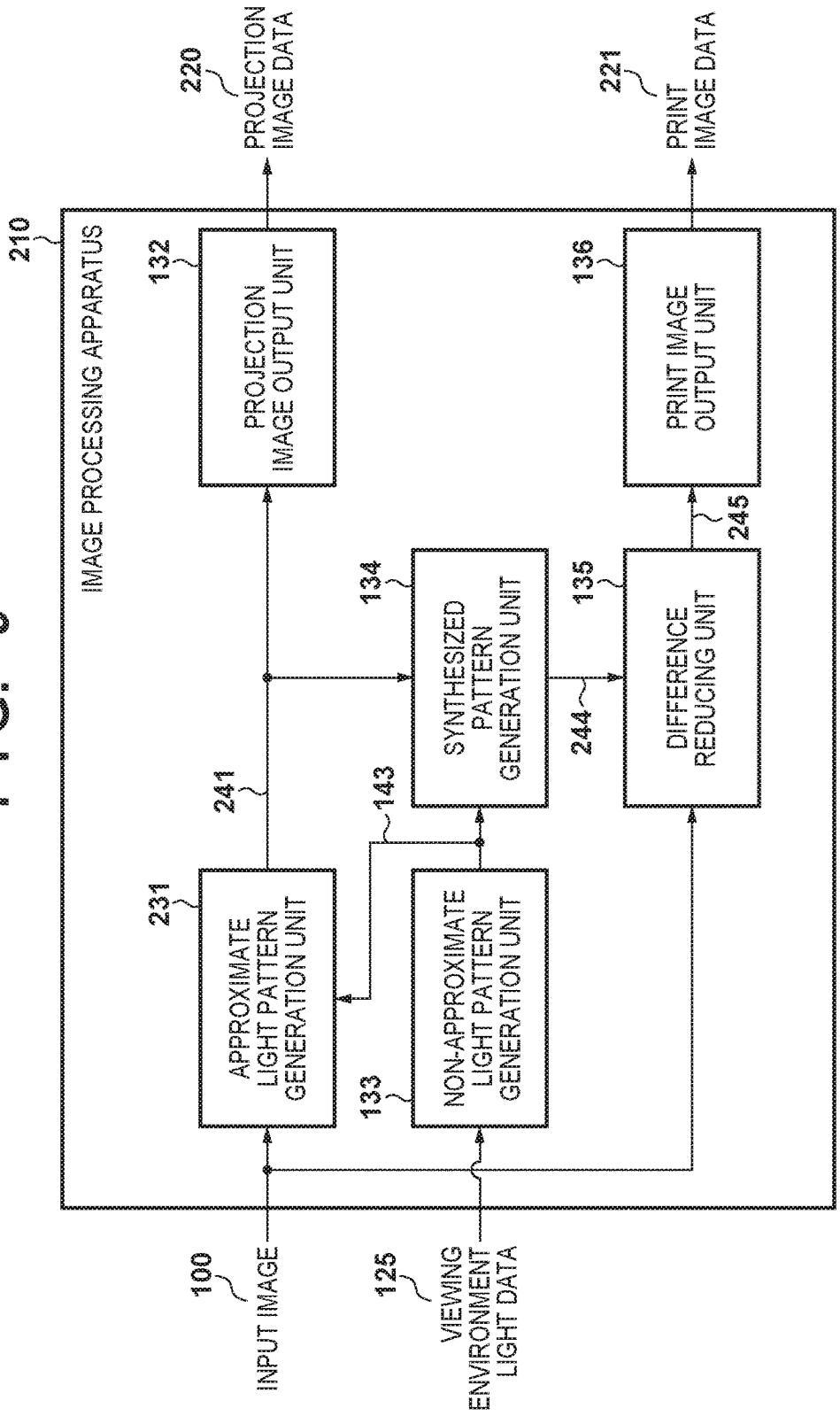
FIG. 9 is a block diagram showing a configuration of an image processing apparatus and relationship between input/output signals according to a second embodiment.

FIG. 9 is a block diagram showing a configuration of an image processing apparatus 210 and relationship between input/output signals in the second embodiment, and is used in place of the image processing apparatus 110 in the first embodiment. Similar to the image processing apparatus 110, the input image 100 and the viewing environment light data 125 are input to the image processing apparatus 210. In addition, the image processing apparatus 210 includes a CPU, a memory circuit, software, and the like (not shown). The difference from the image processing apparatus 110 is that, as shown in FIG. 9, an approximate light pattern generation unit 231 generates an approximate light pattern 241 based on the input image 100 and the non-approximate light pattern 143 generated by the non-approximate light pattern generation unit 133. Then, the approximate light pattern 241 is input to the projection image output unit 132, and projection image data 220 based on the approximate light pattern 241 is output.

Also, to the synthesized pattern generation unit 134, the approximate light pattern 241 and the non-approximate light pattern 143 are input, pixel values are added for each pixel position, and the result is output as a synthesized pattern 244. The difference reducing unit 135 generates a difference reduction image 245 based on the input synthesized pattern 244 and the input image 100 and outputs the difference reduction image 245 to the print image output unit 136. The print image output unit 136 appropriately converts the difference reduction image 245 into a format that can be processed by the printing apparatus 112, and outputs the print image data 221.

Figure 10:
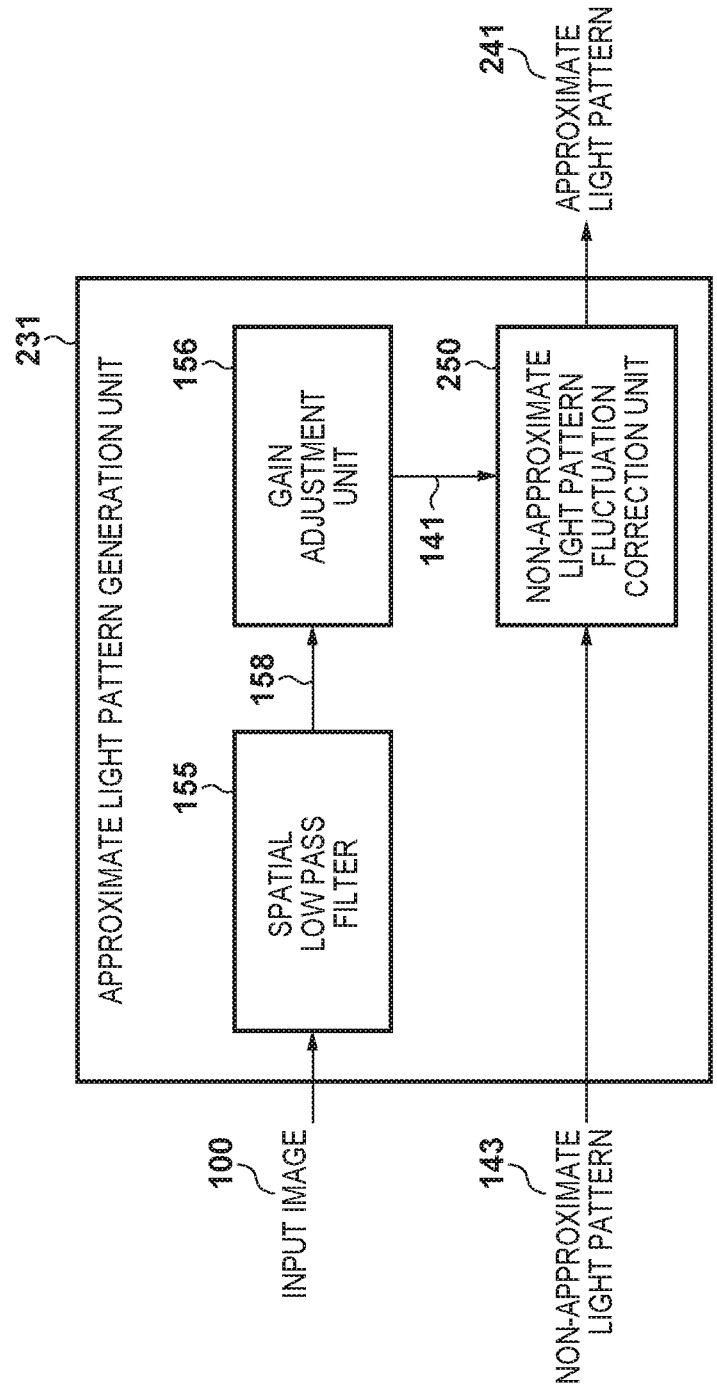
FIG. 10 is a block diagram showing an example of a configuration of an approximate light pattern generation unit according to the second embodiment.

FIG. 10 is a block diagram showing an example of a configuration of the approximate light pattern generation unit 231 in the second embodiment. First, as in the first embodiment, the approximate light pattern 141 is generated by processing the input image 100 by the spatial low pass filter 155 and the gain adjustment unit 156. Next, the approximate light pattern 141 and the non-approximate light pattern 143 are input to a non-approximate light pattern fluctuation correction unit 250, and the fluctuation of the approximate light pattern 141 (that is, the fluctuation of the viewing environment light 103) is corrected, and the approximate light pattern 241 is output. Hereinafter, the processing performed here will be described in detail.

Figure 11:
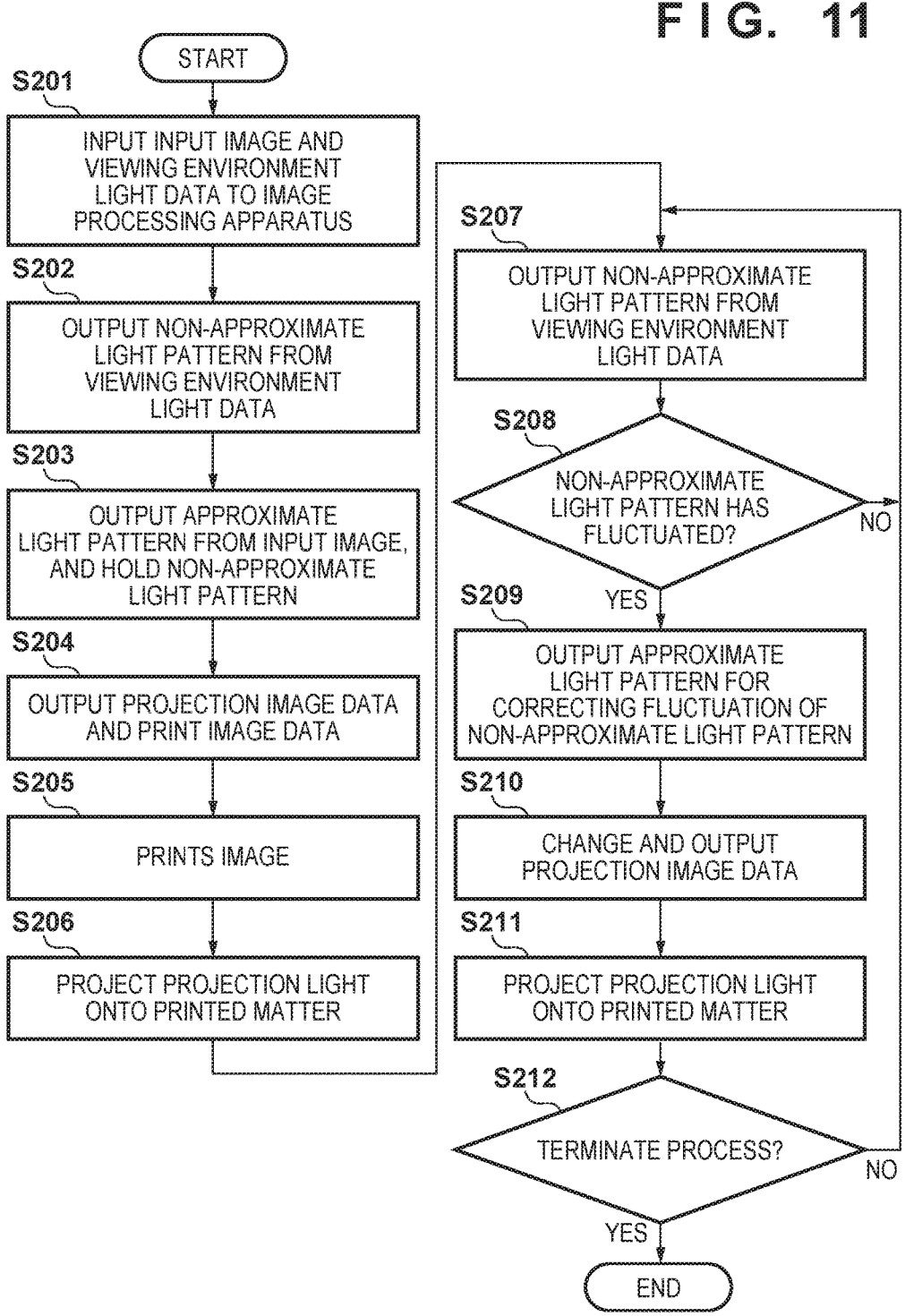
FIG. 11 is a flowchart showing an approximate light pattern generation processing procedure according to the second embodiment.

FIG. 11 is a flowchart showing the generation processing procedure of the approximate light pattern 241 in the second embodiment. First, in step S201, the input image 100 and the viewing environment light data 125 are input to the image processing apparatus 210. In step S202, the non-approximate light pattern generation unit 133 generates the non-approximate light pattern 143 from the viewing environment light data 125. Next, in step S203, the approximate light pattern generation unit 231 generates an approximate light pattern 241 from the input image 100 and outputs it. At this time, when the approximate light pattern 241 is generated for the first time, there is no fluctuation in the non-approximate light pattern 143, so there is no need to make correction by the non-approximate light pattern fluctuation correction unit 250. Therefore, the approximate light pattern 141 output from the gain adjustment unit 156 is output as it is from the approximate light pattern generation unit 231 as the approximate light pattern 241. In the non-approximate light pattern fluctuation correction unit 250, the non-approximate light pattern 143 at this time is held in a memory (not shown) or the like.

Next, in step S204, the projection image data 220 and the print image data 221 are output, in step S205, the printing apparatus 112 prints an image to make the printed matter 102 based on the print image data 221, and in step S206, the image projection apparatus 111 projects the projection light 122 onto the printed matter 102 based on the projection image data 220. The result obtained by the processing from steps S201 to S206 are the same as those in the first embodiment.

Next, in step S207, the non-approximate light pattern generation unit 133 again generates the non-approximate light pattern 143 from the viewing environment light data 125. In step S208, it is determined whether the non-approximate light pattern 143 has fluctuated. Here, the fluctuation of the non-approximate light pattern 143 (that is, the fluctuation of the viewing environment light 103) is fluctuation from the value of the non-approximate light pattern 143 held in the memory or the like in step S203. Here, the fluctuation value from the non-approximate light pattern 143 stored in the memory or the like in step S203 to the non-approximate light pattern 143 generated in step S207 is compared with a predetermined threshold, and if the fluctuation value is not more than the threshold value, it is judged that the non-approximate light pattern 143 has not fluctuated and the process returns to step S207. On the other hand, if the fluctuation value exceeds the threshold value, it is judged that the non-approximate light pattern 143 has fluctuated, and the process shifts to S209.

In step S209, the non-approximate light pattern fluctuation correction unit 250 outputs the approximate light pattern 241 for correcting the fluctuation of the non-approximate light pattern 143. More specifically, correction is performed by changing the approximate light pattern 241 so as to cancel out the fluctuation from the non-approximate light pattern 143 held in the memory or the like in step S203.

Next, in step S210, the projection image output unit 132 changes and outputs the projection image data 220 based on the corrected approximate light pattern 241. In step S211, the image projection apparatus 111 projects the projection light 122 onto the printed matter 102 based on the projection image data 220. In step S212, it is determined whether or not the display process is to be terminated. If not, the process returns to step S207 to continue the above-described processes.

FIGS. 12A to 12F are graphs showing an example of gradation distribution of image data in the same region in the second embodiment. Hereinafter, description will be made by comparison with the graphs of FIGS. 8A to 8F described in the first embodiment.

Figure 12A:
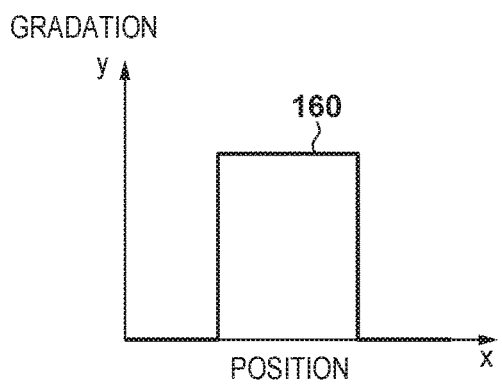
FIGS. 12A to 12F are graphs showing gradation distributions of image data in a same region according to the second embodiment.
Figure 12D:
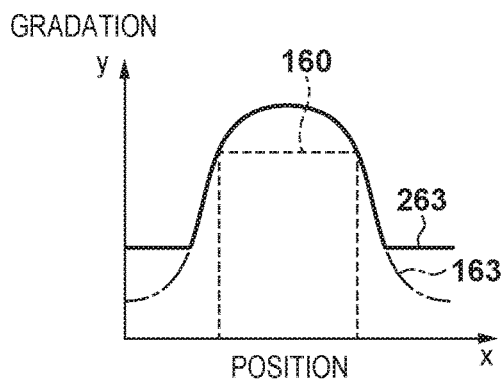

First, the curve 160 showing the input image 100 in FIG. 12A is the same as that in FIG. 8A of the first embodiment. A curve 262 in FIG. 12C shows gradation distribution after the non-approximate light pattern 143 has changed from the curve 162. This corresponds to the non-approximate light pattern 143 in a case where the process proceeds to step S209 as a result of the judgment of step S208 in the flowchart of FIG. 11.

Figure 12B:
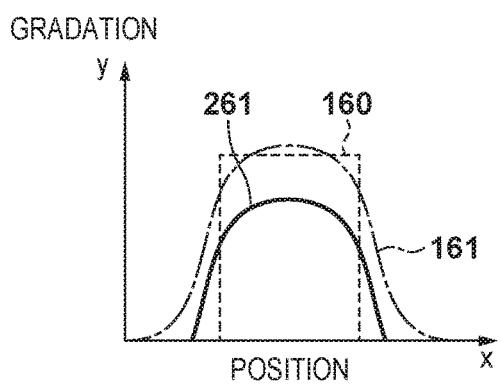

A curve 261 in FIG. 12B is at the time when the approximate light pattern 241 for correcting the fluctuation of the non-approximate light pattern 143 is outputted. This corresponds to the approximate light pattern 241 output in step S209 in the flowchart of FIG. 11.

A curve 263 of FIG. 12D shows the synthesized pattern 244, which is obtained by adding the curve 261 of the approximate light pattern 241 of FIG. 12B and the curve 262 of the non-approximate light pattern 143 of FIG. 12C.

Figure 12E:
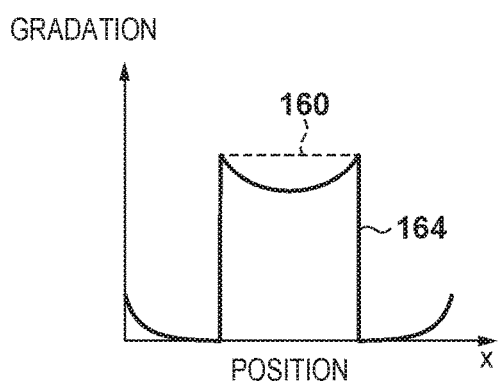
Figure 12C:
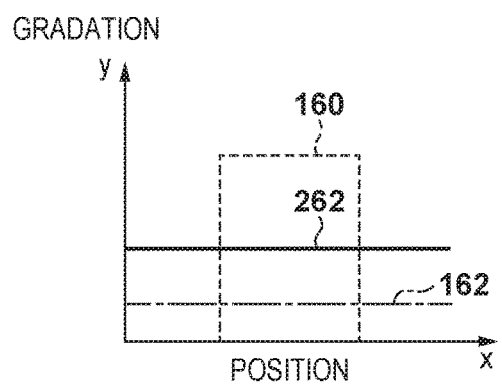

FIG. 12E shows a curve 164 of the difference reduction image 245, which does not change after the difference reduction image 245 is once printed in S205 of FIG. 11.

Figure 12F:
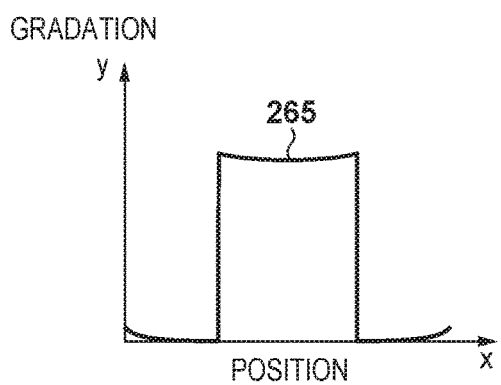

FIG. 12F shows a curve 265 obtained when the pattern of the curve 263 is projected onto the printed matter 102 on which printing is performed based on the curve 164. In the second embodiment, by performing processing according to the change in the viewing environment light 103, the curve 265 becomes substantially equal to the curve 160 of the input image 100.

According to the second embodiment as described above, even when the viewing environment light changes, it is possible to obtain an image of desired quality regardless of the spatial frequency of a projection image.

<Third Embodiment>

Next, a third embodiment of the present invention will be described. In the first embodiment and the second embodiment, it has been shown that an image having a quality desired to be displayed can be obtained regardless of the spatial frequency of a projected image. In the third embodiment, in addition to the above effects, a configuration that can reduce the display error in the case where the position of the projection image data 120 deviates from the printed matter 102 and can obtain the effect of facilitating the positioning will be described. Since the configuration and processing of the approximate light pattern generation unit 131 in the image processing apparatus 110 described with reference to FIG. 4A in the first embodiment are different from an approximate light pattern generation unit of the third embodiment, the differences will be described below. Since other configurations and processes are the same as those of the first embodiment, the same reference numerals are given and explanations thereof are omitted.

FIG. 13 is a block diagram showing an example of a configuration of an approximate light pattern generation unit 331 in the third embodiment, which is used in place of the approximate light pattern generation unit 131 shown in FIG. 4A. The spatial frequency of the input image 100 is lowered by a spatial low pass filter 355, and in this case a parameter based on size information 300 is used to change the spatial frequency. The size information 300 is information indicating the actual display size of the projection image data 120 or the printed matter 102. Next, an approximate light pattern 141 is output via the gain adjustment unit 156. The reason why the size information 300 is used and the specific processing will be described below.

FIGS. 14A to 14D are graphs showing an example of gradation distribution in the case where the position of the projection image data 120 deviates from the printed matter 102. It is to be noted that the graphs shown in FIGS. 8A to 8F of the first embodiment correspond to the case where the position of the projection image data 120 does not deviate. Further, the description of the processing of the non-approximate light pattern 143 by the viewing environment light as shown in FIG. 8C is omitted here.

Figure 14A:
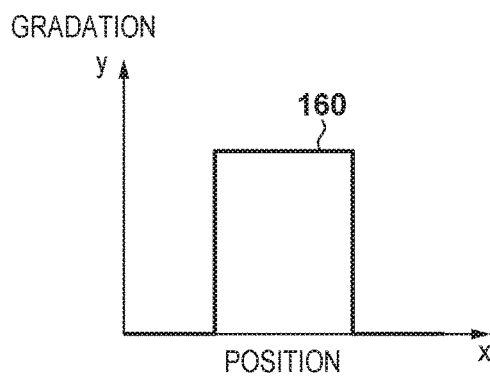
FIGS. 14A to 14D are graphs showing an example of gradation distribution in a case where a position of the projected image is shifted with respect to a printed matter.

FIG. 14A is a graph showing the gradation distribution of the input image 100. Similar to FIG. 8A of the first embodiment, the gradation of the input image 100 has a rectangular shape as shown by the curve 160.

Figure 14C:
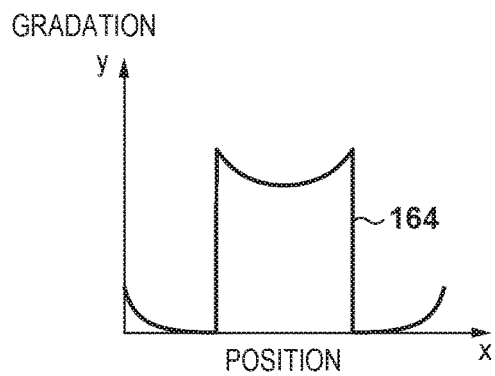
Figure 14B:
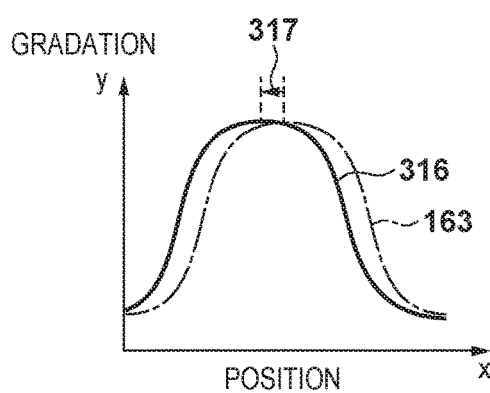

FIG. 14B is a graph showing the gradation distribution and positional shift of the projection image data 120. A curve 316 appears when a positional shift 317 of, for example, 10 pixels occurs with respect to the curve 163 in the case where the position of the projection image data 120 generated from the approximate light pattern 141 is not shifted.

FIG. 14C is a graph showing the gradation distribution of the print image data 121. The gradation distribution of the print image data 121 draws a curve 164 in the same manner as in FIG. 8E of the first embodiment.

Figure 14D:
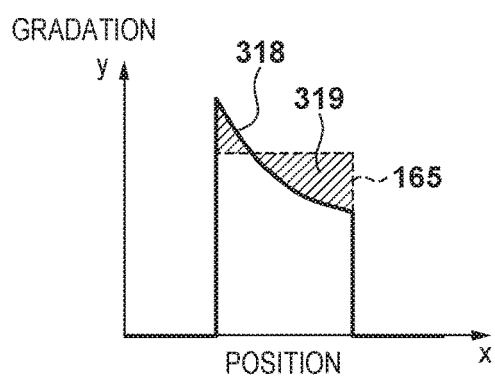

FIG. 14D is a graph showing a display when the projection image data 120 is projected onto the printed matter 102. A curve 318 is obtained when the pattern of the curve 316 in FIG. 14B is projected onto the printed matter 102 printed on the basis of the curve 164 in FIG. 14C. A display error 319 occurs compared to the curve 165 when the position of the projection image data 120 does not deviate. The display error 319 increases in proportion to the magnitude of the positional shift 317, which degrades the display quality. When the positional shift 317 exceeds a certain amount, the curve 318 is visually recognized as a double line, and in some cases, a significant disturbing feeling may be caused. In order to reduce the display error 319 due to the positional shift 317, the spatial frequency of the approximate light pattern 141 is changed using a parameter based on the size information 300.

Figure 15A:
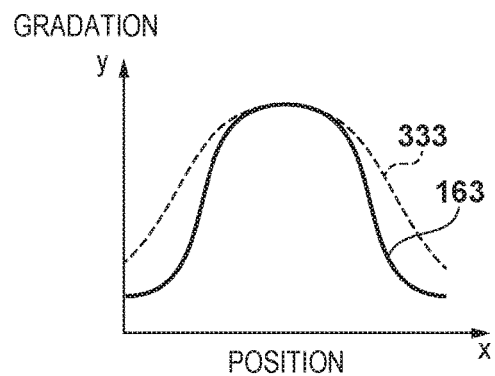
FIGS. 15A and 15B are graphs showing an example of changing the spatial frequency according to the third embodiment.

FIG. 15A is a graph showing an example of a changed spatial frequency of the approximate light pattern 141 (i.e. projection image data 120). A curve 333 is obtained by lowering the spatial frequency of the projection image data 120 by the spatial low pass filter 355 with the parameter based on the size information 300, in comparison with the curve 163 of the projection image data 120 shown in the graphs of FIG. 8D and FIG. 14B. As the spatial frequency decreases, gradation distributions spread in the position direction shown by the horizontal axis.

Figure 15B:
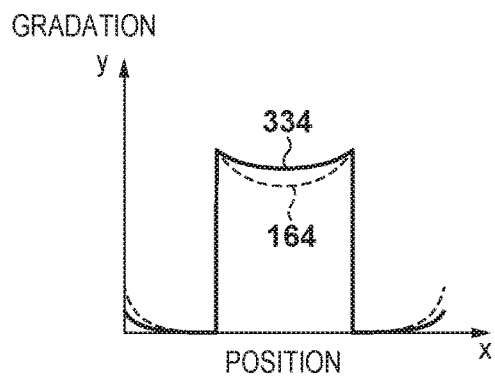

FIG. 15B is a graph showing the gradation distribution of the print image data 121 corresponding to the change of the spatial frequency of the projection image data 120. As the spatial frequency of the projection image data 120 decreases, the gradation distribution exhibits a curve 334 which makes the difference between the input image 100 and a resultant image when the projection image data 120 is projected onto the printed matter 102 small.

FIGS. 16A to 16D are graphs showing examples of gradation distributions in the case where the position is deviated in a case where the spatial frequency of the projection image data 120 is lowered.

Figure 16A:
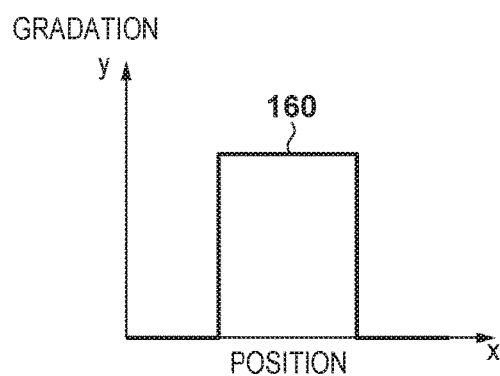
FIGS. 16A to 16D are graphs showing an example of gradation distribution in a case where a position of the projected image is shifted with respect to a printed matter according to the third embodiment.

FIG. 16A is a graph showing the gradation distribution of the input image 100, and exhibits a rectangular shape as shown by the curve 160 similarly to FIG. 14A.

Figure 16C:
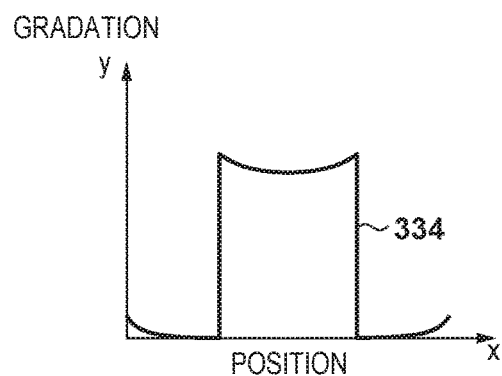
Figure 16B:
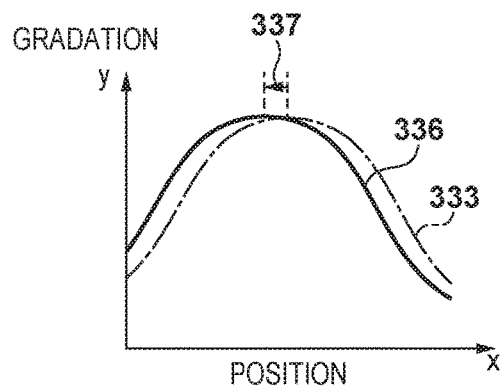

FIG. 16B is a graph showing the gradation distribution and the positional shift of the projection image data 120. With respect to a curve 333 in the case where the position of the projection image data 120 is not shifted, the gradation distribution exhibits a curve 336 when a positional shift 337 of, for example, 10 pixels occurs.

FIG. 16C is a graph showing the gradation distribution of the print image data 121. Similarly to FIG. 15B, the gradation distribution of the print image data 121 exhibits a curve 334.

Figure 16D:
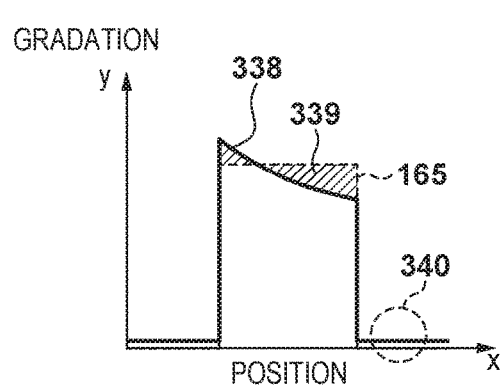

FIG. 16D is a graph showing a display when the projection image data 120 is projected onto the printed matter 102. A curve 338 is obtained when the pattern of the curve 336 in FIG. 16B is projected and superimposed on the printed matter 102 on which printing is performed based on the curve 334 in FIG. 16C. A display error 339 occurs compared to the curve 165 when the position of the projection image data 120 is not shifted, however, it is smaller than the display error 319 in FIG. 14D. This is the effect of lowering the spatial frequency of projection image data 120. However, as shown in a region 340, the brightness of the black display part slightly increases as a trade-off, and the contrast ratio decreases. Therefore, it is desirable to appropriately change the spatial frequency of the projection image data 120, considering the balance between the reduction of the display error caused by the positional shift and the contrast ratio.

FIGS. 17A and 17B are schematic diagrams showing the relationship between the actual display size and the spatial frequency when the spatial frequency of the projection image data 120 is not changed.

FIG. 17A is a schematic diagram when printing and projecting are performed with respect to, for example, a standard A1-size paper. In the actual display size 320 corresponding to the A1 size, the projection image data 120 is projected at spatial frequency 321.

FIG. 17B is a schematic diagram when printing and projection are performed with respect to, for example, a standard A2-size paper. In the actual display size 323 corresponding to the A2 size (half of the A1 size), the projection image data 120 is projected at spatial frequency 324. If the spatial frequency of the projection image data 120 is not changed, the spatial frequency 324 of a printed image and a projected image will be twice the spatial frequency 321 in FIG. 17A in the actual dimension.

In the graphs of FIGS. 14A to 14D and FIGS. 16A to 16D, the positional shift is assumed to be 10 pixels on the image data, however, it is desirable to consider actual positional shift in a predetermined actual size (for example, 2 mm). Especially, if alignment is performed manually, the limit of positional shift is determined by actual size although there are individual differences.

For example, it is assumed that when an image is projected at the spatial frequency 321 in FIG. 17A, the positional shift up to 2 mm in actual dimension falls within a tolerance of a predetermined display error and disturbance is not perceived. At this time, at the spatial frequency 324 (twice the spatial frequency 321) in FIG. 17B, disturbance is perceived with a positional shift exceeding 1 mm in the actual dimension. Accordingly, in the third embodiment, the spatial frequency of the projection image data 120 is changed according to the actual display size.

Figure 18:
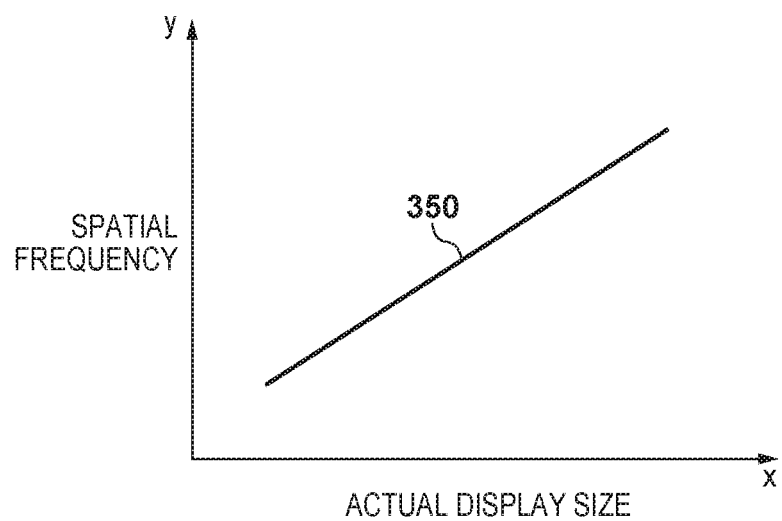
FIG. 18 is a graph showing an example of the relationship between the actual display size and the spatial frequency according to the third embodiment.

FIG. 18 is a graph showing an example of the relationship between the actual display size and the spatial frequency of the projection image data 120, wherein the x axis indicates the actual display size and the y axis indicates the spatial frequency of the projection image data 120. As the actual display size increases, the spatial frequency is changed as shown by a line 350 that increases the spatial frequency of the projection image data 120. As a result, regardless of the actual display size, the spatial frequency after printing and projection is maintained.

The line 350 shown in FIG. 18 may be changed according to the viewing distance of the user. For example, it is configured so that the user can input the viewing distance using GUI in advance. When the viewing distance is long, a positive offset is added to the line 350 in the y-axis direction so as to give a priority to the contrast ratio, rather than reduction in display error due to positional shift. As a result, the spatial frequency after printing and projection becomes higher and the contrast ratio becomes higher.

FIGS. 19A and 19B are schematic diagrams showing the actual display size and the spatial frequency when the spatial frequency of the projection image data 120 is changed using the line 350.

FIG. 19A is the same as FIG. 17A, and in real display size 320 corresponding to the A1 size, the projection image data 120 is projected at the spatial frequency 321.

In FIG. 19B, in the actual display size 323 corresponding to the A2 size (half of the A1 size), the projection image data 120 is projected at the spatial frequency 344. When changing the spatial frequency of the projection image data 120 using the line 350, a spatial frequency 344 after printing and projection is equivalent to the spatial frequency 321 in FIG. 19A. At this time, for both the actual display size 320 of the A1 size and the actual display size 323 of the A2 size, the positional shift up to 2 mm, for example, in the actual size falls within a tolerance of a predetermined display error, and disturbance is not perceived.

According to the third embodiment as described above, the display error in the case where the position of the projection image data 120 deviates with respect to the printed matter 102 is reduced, and it is possible to attain the effect of the reduction of the display error regardless of the actual display size of the projection image data 120 or of the printed matter 102.

It should be noted that, in the description of the approximate light pattern generation unit 331 in FIG. 13, the spatial frequency of the approximate light pattern 141 (that is, the projection image data 120) is changed with a parameter based on the size information 300, however, other configurations are conceivable.

FIG. 20 is a block diagram showing an example of a configuration of an approximate light pattern generation unit 331' in the third embodiment. The spatial frequency of the input image 100 is changed with a parameter based on the size information 300 by a spatial low pass filter 355' and the resultant is output as the approximate light pattern 141. In addition to this, the spatial low pass filter 355' also outputs an optical filter adjustment parameter 370. The spatial frequency of the projection image data 120 is not only changed by processing on the image data but also by optical processing using the optical filter adjustment parameter 370. For example, it is conceivable to use means such as shifting the focus of a projection lens (focus adjustment unit) of the image projection apparatus 111, inserting a diffusion filter before or after the projection lens, and vibrating to diffuse the projected image with a vibration element.

<Fourth Embodiment>

Next, a fourth embodiment of the present invention will be described. In the third embodiment described above, assuming that the positional shift of the projection image data 120 occurs with a predetermined actual size (for example, 2 mm), the spatial frequency of the projection image data 120 is changed so that the display error at that time falls within a predetermined range. In the fourth embodiment, a configuration that can be applied to a case where an amount of the positional shift varies depending on an installation condition of the image projection apparatus 111 and also on a region in a plane of the projection image data 120 will be described. Since the configuration and processing of the approximate light pattern generation unit 131 in the image processing apparatus 110 described with reference to FIG. 4A in the first embodiment are different from those in the fourth embodiment, the differences will be described below. Other configurations and processes are the same as those of the first embodiment, and the same reference numerals are given and explanations thereof are omitted.

FIG. 21 is a block diagram showing an example of a configuration of an approximate light pattern generation unit 431 in the fourth embodiment, which is used in place of the approximate light pattern generation unit 131 shown in FIG. 4A. The spatial frequency of the input image 100 is lowered by a spatial low pass filter 455, and here, the spatial frequency is changed with a parameter based on the size information 300 and alignment information 400. The alignment information 400 is information indicating the installation condition of the image projection apparatus 111, the position of an alignment marker, and alignment ability. Then, the approximate light pattern 141 is output via the gain adjustment unit 156. The reason why the alignment information 400 is used and the specific processing will be described below.

Figure 22A:
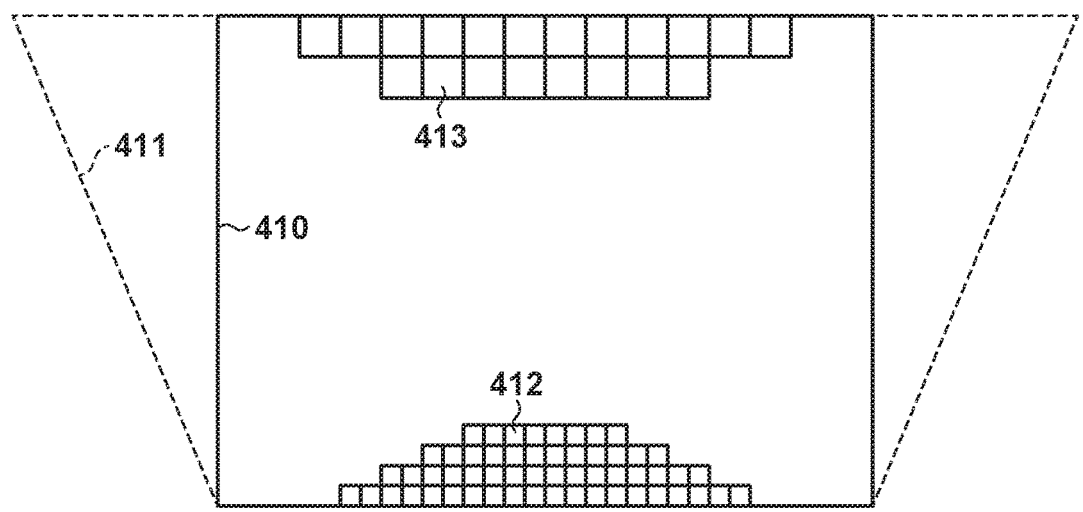
FIG. 22A is a schematic diagram showing an in-plane distribution of spatial frequency of a projected image according to the fourth embodiment.

FIG. 22A is a schematic diagram showing an projection image 410 and the distribution of the spatial frequency in the plane of the projection image 410 under the installation condition of the image projection apparatus 111 of the fourth embodiment. In a case where the image projection apparatus 111 is installed facing upward with respect to the printed matter 102 placed upright, the projected image spreads like a trapezoid 411. In this case, the projection image 410 undergoes image processing for correcting trapezoidal distortion in consideration of the trapezoid 411, and is projected. In this case, in the trapezoidal distortion-corrected projection image 410, since the amount of deformation of the trapezoidal distortion is large and the correction amount is also large in the upper portion (on the longer side of the trapezoid), positional shift tends to occur in the upper portion. On the other hand, in the lower portion (on the short side of the trapezoid), the correction amount of the trapezoidal distortion is small, and positional shift does not often occur in the lower portion. Under such installation condition, a spatial frequency 413 is lowered in the upper portion where the positional shift tends to occur, thereby suppressing the display error when positional shift occurs. On the other hand, with respect to the lower portion where positional shift does not often occur, priority is given to raising the contrast ratio by increasing a spatial frequency 412.

Figure 22B:
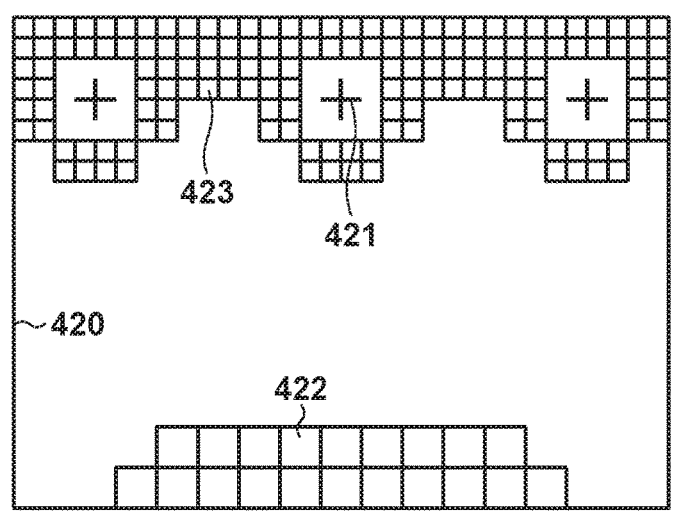
FIG. 22B is a schematic diagram showing an in-plane distribution of spatial frequency according to the fourth embodiment.

FIG. 22B is a schematic diagram showing a marker position for automatic alignment of the image projection apparatus 111 and the distribution of the spatial frequency in the plane of the printed matter 102 in the fourth embodiment. It is conceivable to place a marker 421 for alignment on a part in the plane of the printed matter 102. For example, invisible ink may be used as the marker 421, and the marker 421 is placed in an important area (face, character, etc.) in the plane. At this time, since the alignment is performed with high accuracy by the automatic alignment in the vicinity of the marker 421, priority is given to raising the contrast ratio by increasing a spatial frequency 423. On the other hand, with respect to an area far from the marker 421 where positional shift easily occurs, a spatial frequency 422 is lowered in order to suppress display error when positional shift occurs.

FIG. 23 is a flowchart showing a processing procedure in the fourth embodiment. First, in step S431, the input image 100 is input to the image processing apparatus 110. Next, in step S432, the projection image data 120 is provisionally output from the image processing apparatus 110. Note that the projection image data 120 provisionally output at this time may be generated as described in the first embodiment or may be generated without performing special image processing on the input image 100. In step S433, the image projection apparatus 111 provisionally projects the projection light 122 based on the provisionally output projection image data 120.

In step S434, provisional projection on a wall or blank paper is photographed with a built-in camera of the image processing apparatus 110 and analyzed by a CPU, thereby grasping the installation condition of the image projection apparatus 111, the position of the alignment marker, and so forth. In step S435, the alignment information 400 is generated from the installation condition and the like of the image projection apparatus 111 obtained in step S434. Next, in step S436, the approximate light pattern 141 is output based on the input image 100 by the approximate light pattern generation unit 431 using the parameter based on the size information 300 and the alignment information 400. Finally, in step S437, the projection image data 120 and the print image data 121 are outputted from the image processing apparatus 110 as described in the first embodiment. In step S438, printing of the printed matter 102 and projection of the projection light 122 are performed, and the process ends.

According to the fourth embodiment as described above, the present invention can also be applied to the case where an amount of positional shift varies depending on the installation condition of the image projection apparatus 111 and also for each region in the plane of the projection image data 120.

In the above-described example of the fourth embodiment, the image processing apparatus 110 automatically changes the spatial frequency of the projection image data 120, however, the spatial frequency may be arbitrarily set according to the user's intention. FIG. 24 is an example of a GUI in the case of determining the spatial frequency according to the user's intention. A spatial frequency 440 of the projection image data 120 can be arbitrarily set after notifying that there is a trade-off relationship between display error due to positional shift and improvement in contrast ratio.

<Fifth Embodiment>

Next, a fifth embodiment of the present invention will be described. Unlike the third embodiment and the fourth embodiment described above, in the fifth embodiment, a configuration that can suitably perform processing depending upon the content of the input image 100 will be described. Since the configuration and processing of the approximate light pattern generation unit 131 in the image processing apparatus 110 described with reference to FIG. 4A in the first embodiment are different from those in the fifth embodiment, the differences will be described below. Other configurations and processes are the same as those of the first embodiment, and the same reference numerals are given and explanations thereof are omitted.

FIG. 25 is a block diagram showing an example of a configuration of an approximate light pattern generation unit 531 and the peripheral portion in the fifth embodiment, which is used in place of the configuration shown in FIG. 4A. The input image 100 is also input to a content analysis unit 500 in addition to a spatial low pass filter 555, and the content analysis unit 500 outputs content analysis information 501.

The spatial frequency of the input image 100 is lowered by the spatial low pass filter 555, and here, the spatial frequency is changed using a parameter based on the content analysis information 501. The content analysis information 501 is information obtained by analyzing the content of the image for each region of the image. For example, a region of interest, a background region, a human face, character information, etc. are detected and included in the analysis information. Then, an approximate light pattern 141 is output via the gain adjustment unit 156. The reason why the content analysis information 501 is used and the specific processing will be described below.

FIG. 26A is a diagram showing an example of the input image 100 in the fifth embodiment. From the input image 100, the content analysis unit 500 detects a region of interest 511 and a background region 512. Here, the region of interest 511 is a portion of sparkling fireworks, which is an important area that viewers pay attention and has a large amount of information. On the other hand, the background region 512 is a background part with a small amount of information, such as sky.

FIG. 26B is a schematic diagram showing the distribution of the spatial frequency in the plane of the projected image of the input image 100 shown in FIG. 26A. The spatial low pass filter 555 increases the contrast ratio by increasing a spatial frequency 521 for the partial area of the fireworks detected as the region of interest 511 in FIG. 26A using the parameter based on the input content analysis information Prioritize. It should be noted that alignment is preferentially performed on the region of interest 511. On the other hand, in the partial region of sky detected as the background region 512 in FIG. 26A, a spatial frequency 522 is lowered to suppress the display error when positional shift occurs. Further, the spatial frequencies of partial regions connecting the region of interest 511 and the background region 512 are changed so as to be intermediate between the respective spatial frequencies of the region of interest 511 and the background region 512.

According to the fifth embodiment as described above, it is possible to display an image of desired quality according to the content of the input image 100.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-122472, filed on Jun. 22, 2017 which is hereby incorporated by reference herein in its entirety.

What is claimed is:

1. An image processing apparatus comprising:
a first generation unit that generates approximate light pattern by adjusting spatial frequency of an input image, and generate projection image data based on the approximate light pattern; and
a second generation unit that generates print image data based on the input image,
wherein the second generation unit generates the print image data so that a difference between the input image and an image for observation obtained by superimposing projection light projected by a printer based on the projection image data onto a printed matter on which an image is printed by a printer based on the print image data is reduced, and
wherein the first generation unit and the second generation unit are implemented via at least one processor.

2. The image processing apparatus according to claim 1 further comprising a third generation unit that generates a synthesized pattern by synthesizing the approximate light pattern and a non-approximate light pattern which is based on an environment light at the time of viewing the image for observation,
wherein the second generation unit generates the print image data based on a result of division of dividing pixel values of the input image by pixel values the synthesized pattern pixel by pixel, and wherein the third generation unit is implemented via the at least one processor.

3. The image processing apparatus according to claim 2, wherein the third generation unit generates the synthesized pattern by adding pixel values of the approximate light pattern and pixel values of the non-approximate light pattern pixel by pixel.

4. The image processing apparatus according to claim 2, wherein the first generation unit generates the approximate light pattern by cancelling out a fluctuation amount of the non-approximate light pattern from a pattern obtained by adjusting the spatial frequency of the input image.

5. The image processing apparatus according to claim 1, wherein the first generation unit generates the approximate light pattern by lowering a spatial frequency of the input image based on a parameter.

6. The image processing apparatus according to claim 5, wherein the first generation unit changes the parameter in accordance with a size of an image to be displayed by the projection light or a size of the printed matter.

7. The image processing apparatus according to claim 6, wherein the first generation unit changes the parameter so that the spatial frequency becomes higher for a larger size of the image to be displayed by the projection light or of the printed matter.

8. The image processing apparatus according to claim 5, wherein the first generation unit changes the parameter so that the spatial frequency becomes higher for a longer distance at which the image for observation is observed.

9. The image processing apparatus according to claim 5, wherein the first generation unit changes the parameter in accordance with alignment information at a time of superimposing the projection light onto the printed matter.

10. The image processing apparatus according to claim 9, wherein the alignment information includes installation condition of the projector.

11. The image processing apparatus according to claim 10, wherein the first generation unit obtains a trapezoidal distortion amount of the projection light based on the installation information of the image projection unit, and changes the parameter so that the spatial frequency becomes lower for a larger trapezoidal distortion amount.

12. The image processing apparatus according to claim 9, wherein the alignment information includes a position of an alignment marker at a time of superimposing the projection light onto the printed matter.

13. The image processing apparatus according to claim 12, wherein the first generation unit changes the parameter so that the spatial frequency becomes higher in a region closer to the alignment marker.

14. The image processing apparatus according to claim 5, wherein the first generation unit changes the parameter in accordance with content analysis information of the input image.

15. The image processing apparatus according to claim 14, wherein the content analysis information includes at least any of a region of interest, a background region, a human face, and character information in the input image.

16. The image processing apparatus according to claim 5, wherein the parameter can be set for each partial region of the input image.

17. An image processing apparatus comprising:
a first generation unit that generates approximate light pattern by adjusting spatial frequency of an input image, and generates first projection image data based on the approximate light pattern; and
a second generation unit that generates second projection image data based on the input image,
wherein the second generation unit generates the second projection image data so that a difference between the input image and an image obtained by superimposing a projection light projected by a first projector based on the first projection image data onto an image formed with a projection light projected by a second projector based on the second projection image data is reduced, and
wherein the first generation unit and the second generation unit are implemented via at least one processor.

18. An image processing method comprising:
generating approximate light pattern by adjusting spatial frequency of an input image, and generating a projection image data based on the approximate light pattern; and
generating a print image data based on the input image,
wherein the print image data is generated so that a difference between the input image and an image for observation obtained by superimposing projection light projected by a projector based on the projection image data onto a printed matter on which an image is printed by a printer based on the print image data is reduced.

19. An image processing apparatus comprising:
generating approximate light pattern by adjusting spatial frequency of an input image, and generating first projection image data based on the approximate light pattern; and
generating second projection image data based on the input image,
wherein the second projection image data is generated so that a difference between the input image and an image obtained by superimposing a projection light projected by a first projector based on the first projection image data onto an image formed with a projection light projected by a second projector based on the second projection image data is reduced.

20. A non-transitory storage medium readable by a computer, the storage medium storing a program that is executable by the computer, wherein the program includes program code for causing the computer to function as an image processing apparatus comprising:
a first generation unit that generates approximate light pattern by adjusting spatial frequency of an input image, and generates projection image data based on the approximate light pattern; and
a second generation unit that generates print image data based on the input image,
wherein the second generation unit generates the print image data so that a difference between the input image and an image for observation obtained by superimposing projection light projected by a projector based on the projection image data onto a printed matter on which an image is printed by a based on the print image data is reduced.

21. A non-transitory storage medium readable by a computer, the storage medium storing a program that is executable by the computer, wherein the program includes program code for causing the computer to function as an image processing apparatus comprising:
a first generation unit that generates approximate light pattern by adjusting spatial frequency of an input image, and generates first projection image data based on the approximate light pattern; and
a second generation unit that generates second projection image data based on the input image, wherein he second generation unit generates the second projection image data so that a difference between the input image and an image obtained by superimposing a projection light projected by a first projector based on the first projection image data onto an image formed with a projection light projected by a second projector based on the second projection image data is reduced.

22. The image processing apparatus according to claim 1, wherein the input image is a high dynamic range (HDR) image.

23. The image processing apparatus according to claim 22, wherein the HDR image is subjected to tone processing using a PQ curve.

24. The image processing apparatus according to claim 1, wherein a spatial frequency of the projection image data is lower than a spatial frequency of the print image data.

25. The image processing apparatus according to claim 1, wherein the first generation unit adjusts a spatial frequency of the input image based on a correction amount for correcting trapezoidal distortion.

\* \* \* \* \*